US009275095B2

(12) United States Patent
Bhattacharjee et al.

(10) Patent No.: US 9,275,095 B2
(45) Date of Patent: Mar. 1, 2016

(54) COMPRESSING A MULTI-VERSION DATABASE

(71) Applicant: International Business Machines Corporation, Armonk, NY (US)

(72) Inventors: Bishwaranjan Bhattacharjee, Yorktown Heights, NY (US); Mustafa Canim, Ossining, NY (US); Mohammad Sadoghi Hamedani, White Plains, NY (US); Kenneth A. Ross, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 13/955,764

(22) Filed: Jul. 31, 2013

(65) Prior Publication Data
US 2015/0039573 A1   Feb. 5, 2015

(51) Int. Cl.
G06F 17/30          (2006.01)
(52) U.S. Cl.
CPC .... G06F 17/30356 (2013.01); G06F 17/30153 (2013.01); G06F 17/30309 (2013.01); G06F 17/30312 (2013.01)
(58) Field of Classification Search
None
See application file for complete search history.

(56) References Cited

U.S. PATENT DOCUMENTS

| 6,732,125 B1 | 5/2004 | Autrey et al. |
| 7,685,181 B2 | 3/2010 | Bhattacharjee et al. |
| 7,752,402 B2 | 7/2010 | Fachan et al. |
| 8,117,406 B2 | 2/2012 | Whang et al. |
| 8,161,015 B2 | 4/2012 | Kennedy et al. |
| 8,250,333 B2 | 8/2012 | Gorobets et al. |
| 8,620,884 B2 | 12/2013 | Calder et al. |
| 2004/0249838 A1* | 12/2004 | Hinshaw et al. ............... 707/100 |
| 2005/0108294 A1* | 5/2005 | Koerner et al. ............... 707/200 |
| 2008/0228795 A1* | 9/2008 | Lomet .......................... 707/101 |
| 2010/0106695 A1 | 4/2010 | Calder et al. |
| 2010/0198849 A1* | 8/2010 | Thomas et al. ............... 707/758 |
| 2012/0221528 A1 | 8/2012 | Renkes et al. |
| 2014/0310231 A1* | 10/2014 | Sampathkumaran et al. 707/602 |
| 2015/0039559 A1 | 2/2015 | Bhattacharjee et al. |

OTHER PUBLICATIONS

Agrawal et al., "Lazy-Adaptive Tree: An Optimized Index Structure for Flash Devices", Proceedings of the VLDB Endowment, vol. 2, No. 1, Aug. 2009, pp. 361-372.

Athanassoulis et al., "MaSM: Efficient Online Updates in Data Warehouses", Proceedings of the 2011 ACM SIGMOD International Conference on Management of Data (SIGMOD '11), Jun. 2011, pp. 865-876.

Bhattacharjee et al., "Efficient Bulk Deletes for Multi Dimensional Clustered Tables in DB2", Proceedings of the 33rd International Conference on Very Large Databases, Sep. 2007, pp. 1197-1206.

(Continued)

Primary Examiner — Robert Beausoliel, Jr.
Assistant Examiner — Pedro J Santos
(74) Attorney, Agent, or Firm — Yee & Associates, P.C.; Nidhi Garg

(57) ABSTRACT

Managing a multi-version database is provided. A logical record identifier to physical record row identifier indirection mapping table on a solid-state storage device is extended to include a plurality of delta blocks. A delta block within the plurality of delta blocks is maintained for each primary key in a plurality of primary keys associated with a data table on a magnetic hard disk storage device.

7 Claims, 31 Drawing Sheets

(56) References Cited

OTHER PUBLICATIONS

Bhattacharjee et al., "Enhancing Recovery Using an SSD Buffer Pool Extension", Proceedings of the Seventh International Workshop on Data Management on New Hardware (DaMoN 2011), Jun. 2011, pp. 10-16.
Bhattacharjee et al., "Managing a Multi-Version Database", U.S. Appl. No. 13/904,219, filed May 29, 2013, 67pages.
Canim et al. "An Object Placement Advisor for DB2 Using Solid State Storage", Proceedings of the VLDB Endowment vol. 2, No. 2, Aug. 2009, pp. 1318-1329.
Canim et al. "SSD Bufferpool Extensions for Database Systems." Proceedings of the VLDB Endowment vol. 3, No. 1-2, Sep. 2010, pp. 1435-1446.
Chen et al., "CAFTL: A Content-Aware Flash Translation Layer Enhancing the Lifespan of Flash Memory based Solid State Drives", Proceedings of the 9th USENIX Conference on File and Storage Technologies (FAST'11), Feb. 2011, pp. 77-90.
Cudré-Mauroux et al., "AVS: The Array Versioning System", Presented at the 4th Extremely Large Databases Conferences, Oct. 2010, 6 pages.
Debnath et al., "SkimpyStash: RAM Space Skimpy Key-Value Store on Flash-based Storage", Proceedings of the 2011 ACM SIGMOD International Conference on Management of Data (SIGMOD '11), Jun. 2011, pp. 25-36.
Do et al. "Turbocharging DBMS Buffer Pool Using SSDs", Proceedings of the 2011 ACM SIGMOD International Conference on Management of Data (SIGMOD '11), Jun. 2011, pp. 1113-1124.
Hanssen, "Concurrency control in distributed geographical database systems", Proceedings of the 9th Scandinavian Research Conference on Geographical Information Science (ScanGIS 2003), Jun. 2003, 14 pages.
Hitz et al., "File System Design for an NFS File Server Appliance", Proceedings of the USENIX Winter 1994 Technical Conference, Jan. 1994, 23 pages.
Jouini et al., "Indexing Multiversion Databases", Proceedings of the Sixteenth ACM Conference on Information and Knowledge Management (CIKM '07), Nov. 2007, pp. 915-918.
Kang et al., "Flash-Based Extended Cache for Higher Throughput and Faster Recovery", Proceedings of the VLDB Endowment, vol. 5, No. 11, Jul. 2012, pp. 1615-1626.
Levandoski et al., "The Bw-Tree: A B-tree for New Hardware Platforms", Proceedings of the 29th IEEE International Conference on Data Engineering (ICDE 2013), Apr. 2013, 12 pages.
Li et al., "Tree Indexing on Flash Disks", Proceedings of the 2009 IEEE International Conference on Data Engineering, Mar.-Apr. 2009, pp. 1303-1306.
Lomet et al., "Access Methods for Multiversion Data", Proceedings of the 1989 ACM SIGMOD International Conference on Management of Data (SIGMOD '89), Jun. 1989, pp. 315-324.
Lomet et al., "Immortal DB: Transaction Time Support for SQL Server", Proceedings of the 2005 ACM SIGMOD International Conference on Management of Data (SIGMOD 2005), Jun. 2005, pp. 939-941.
Lomet et al., "Transaction Time Indexing with Version Compression", Proceedings of the VLDB Endowment, Aug. 2008, pp. 870-881.
Lomet al., "Transaction Time Support Inside a Database Engine," Proceedings of the 22nd International Conference on Data Engineering (ICDE '06), Apr. 2006, 12 pages.
O'Neil et al., "The Log-Structured Merge-Tree (LSM-tree)", Acta Informatica vol. 33, No. 4, Jun. 1996, pp. 351-385.
Omiecinski et al., "Analysis of a Deferred and Incremental Update Strategy for Secondary Indexes." Information Systems, vol. 16, No. 3, Feb. 1991, pp. 345-356.
Roh et al., "B+-tree Index Optimization by Exploiting Internal Parallelism of Flash-based Solid State Drives", Proceedings of the VLDB Endowment, vol. 5, No. 4, Aug. 2011, pp. 286-297.
Rosenblum et al., "The Design and Implementation of a Log-Structured File System" ACM Transactions on Computer Systems, vol. 10, No. 1, Feb. 1992, pp. 26-52.
Sears et al., "bLSM: A General Purpose Log Structured Merge Tree", Proceedings of the 2012 International Conference on Management of Data (SIGMOD '12), May 2012, pp. 217-228.
Seering et al. "Efficient Versioning for Scientific Array Databases", Proceedings of the IEEE 28th International Conference on Data Engineering (ICDE 2012), Apr. 2012, pp. 1013-1024.
Severance et al., "Differential Files: Their Application to the Maintenance of Large Databases", ACM Transactions on Database Systems, vol. 1, No. 3, Sep. 1976, pp. 256-267.
Vo et al., "LogBase: A Scalable Log-structured Database System in the Cloud", Proceedings of the VLDB Endowment, vol. 5, No. 10, Aug. 2012, pp. 1004-1015.
Wu et al., "An Efficient B-Tree Layer for Flash-Memory Storage Systems", Proceedings of the 9th International Conference on Real-Time and Embedded Computing Systems and Applications, Feb. 2003, pp. 409-430.
Yang et al., "I-CASH: Intelligently Coupled Array of SSD and HDD", IEEE 17th International Symposium on High Performance Computer Architecture (HPCA), Feb. 2011, pp. 278-289.
Office Action, dated Aug. 14, 2015, regarding U.S. Appl. No. 13/969,538, 23 pages.

* cited by examiner

COMPRESSING A MULTI-VERSION DATABASE

BACKGROUND

1. Field

The disclosure relates generally to a multi-version database and more specifically to compressing data records stored within the multi-version database.

2. Description of the Related Art

A multi-version database stores both current data records and historical data records in rows of a relational data table. The rows are typically annotated with timestamps representing the time period during which a row is valid or was valid. In a multi-version database system, new data records do not physically replace old ones. Instead, a new version of a data record is generated, which becomes visible to other transactions at commit time. Conceptually, many rows for a data record may exist, each row corresponding to a state of the multi-version database at some point in time.

However, in a multi-version database a challenge exists in managing a footprint of these multiple versions of a data record that are generated during updates. These multiple versions of the data record take up space on a magnetic hard disk drive. As a result, queries on data records stored on the magnetic hard disk drive are slowed down.

SUMMARY

According to one illustrative embodiment, a method for managing a multi-version database is provided. A data processing system extends a logical record identifier to physical record row identifier indirection mapping table on a solid-state storage device to include a plurality of delta blocks. The data processing system maintains a delta block within the plurality of delta blocks for each primary key in a plurality of primary keys associated with a data table on a magnetic hard disk storage device. According to other illustrative embodiments, a data processing system and a computer program product for managing a multi-version database also are provided.

DETAILED DESCRIPTION

Figure 1:
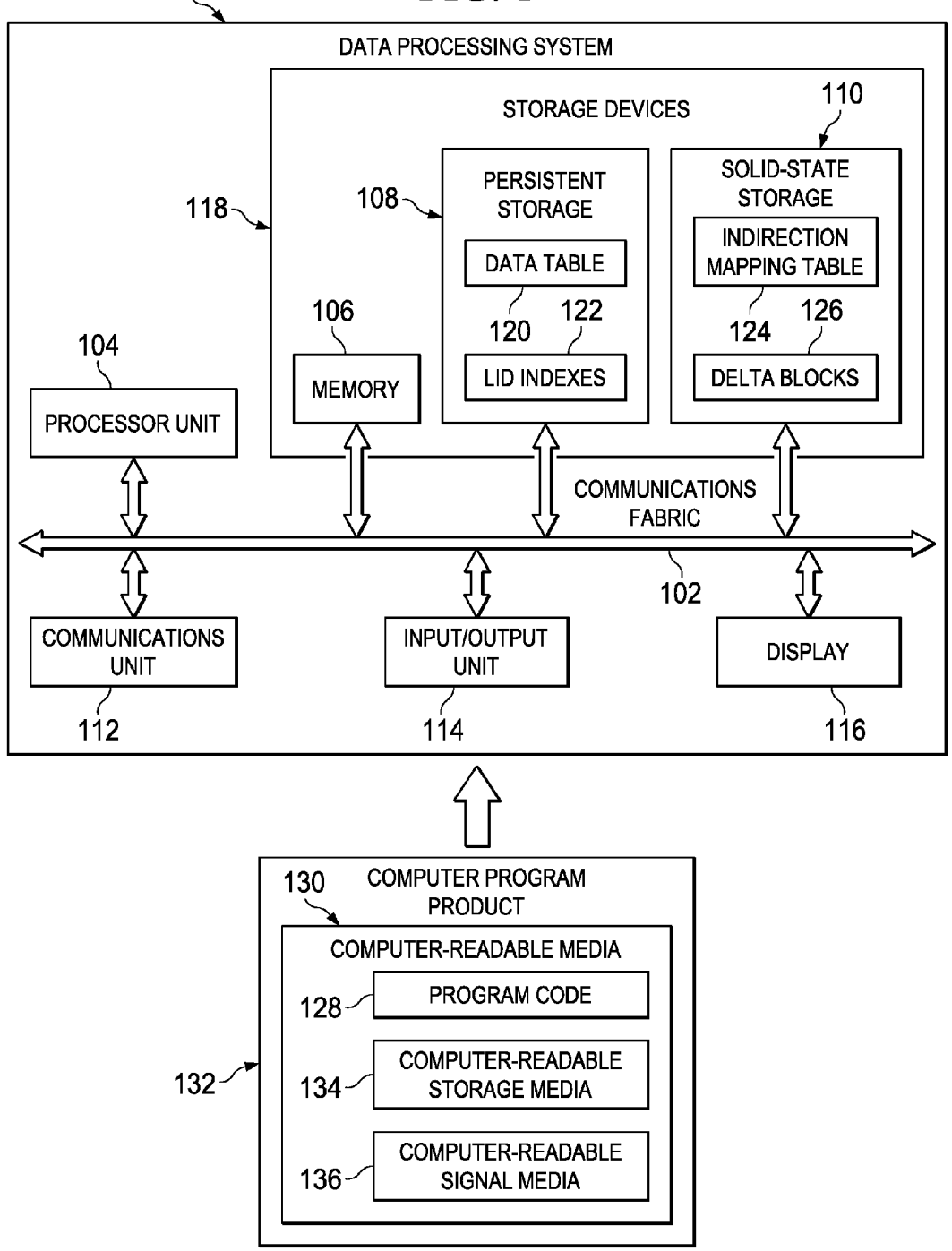
FIG. 1 is a diagram of a data processing system in which illustrative embodiments may be implemented.

As will be appreciated by one skilled in the art, aspects of the illustrative embodiments may be embodied as a data processing system, method, or computer program product. Accordingly, aspects of the illustrative embodiments may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the illustrative embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can store a program for use by or in connection with an instruction execution system, apparatus, or device. In addition, a computer readable storage medium does not include a propagation medium, such as a signal or carrier wave.

A computer readable signal medium may include a propagated data signal with computer readable program code embodied therein, for example, in baseband or as part of a carrier wave. Such a propagated signal may take any of a variety of forms, including, but not limited to, electro-magnetic, infra-red, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described below with reference to flowchart illustrations and/or block diagrams of methods, data processing systems, and computer program products according to illustrative embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular, with reference to FIGS. 1-6, diagrams of data processing environments are provided in which illustrative embodiments may be implemented. It should be appreciated that FIGS. 1-6 are only meant as examples and are not intended to assert or imply any limitation with regard to the environments in which different embodiments may be implemented. Many modifications to the depicted environments may be made.

FIG. 1 depicts a diagram of a data processing system is depicted in accordance with an illustrative embodiment. Data processing system 100 is an example of a computer device in which computer readable program code or instructions implementing processes of illustrative embodiments may be located. Data processing system 100 may be, for example, a server computer or a client computer connected to a network, such as a local area network (LAN), a wide area network (WAN), an intranet, an internet, or the Internet. In this illustrative example, data processing system 100 includes communications fabric 102, which provides communications between processor unit 104, memory 106, persistent storage 108, solid-state storage 110, communications unit 112, input/output (I/O) unit 114, and display 116.

Processor unit 104 serves to execute instructions for software applications or programs that may be loaded into memory 106. Processor unit 104 may be a set of one or more processors or may be a multi-processor core, depending on the particular implementation. Further, processor unit 104 may be implemented using one or more heterogeneous processor systems, in which a main processor is present with secondary processors on a single chip. As another illustrative example, processor unit 104 may be a symmetric multi-processor system containing multiple processors of the same type.

Memory 106 and persistent storage 108 are examples of computer readable storage devices 118. A computer readable storage device is any piece of hardware that is capable of storing information, such as, for example, without limitation, data, computer readable program code in functional form, and/or other suitable information either on a transient basis and/or a persistent basis. Further, a computer readable storage device does not include a propagation medium, such as a signal or carrier wave. Memory 106, in these examples, may be, for example, a random access memory, or any other suitable volatile or non-volatile storage device. Persistent storage 108 may take various forms, depending on the particular implementation. For example, persistent storage 108 may contain one or more devices. For example, persistent storage 108 may be a magnetic hard disc drive (HDD), a flash memory, a rewritable optical disk, a rewritable magnetic tape, or some combination of the above. The media used by persistent storage 108 may be removable. For example, a removable hard disc drive may be used for persistent storage 108.

In this example, persistent storage 108 stores data table 120 and logical record identifier (LID) indexes 122. However, it should be noted that persistent storage 108 may store any type of data, application, program, or module that may be utilized by different illustrative embodiments. Data table 120 may be, for example, a relational data table that stores a plurality of data records in rows and columns. The data records may represent any type of data. For example, the data records may be associated with a financial firm that is required to retain any changes made to client information for up to five years in accordance with auditing regulations or may be associated with a bank that needs to retroactively correct an error in calculating interest rates paid on different accounts.

Logical record identifier indexes 122 are data indexes corresponding to the plurality of data records stored in data table 120. It should be noted that illustrative embodiments include a logical record identifier index for each column of data records in data table 102. Logical record identifier indexes 122 may have, for example, tree structures that include a plurality of leaf pages or nodes. Logical record identifier indexes 122 store entries for version-independent logical record identifiers for each data record located in particular columns of data table 120. In other words, logical record identifier indexes 122 include a version-independent logical record identifier entry for each data record in a plurality of data records stored in a particular column of data table 120. A version-independent logical record identifier is a record identifier that identifies a particular data record in a particular column, but does not identify a particular version of the data record. In other words, the version-independent logical record identifier is not dependent upon a particular version within a plurality of different versions of the data record stored in data table 120.

Solid-state storage 110 is a solid-state drive (SSD) or data storage device using integrated circuit assemblies as memory to store data persistently. Solid-state storage 110 uses electronic interfaces compatible with persistent storage 108. Solid-state storage 110 has lower access time and less latency than persistent storage 108.

In this example, solid-state storage 110 stores indirection mapping table 124 and delta blocks 126. However, it should be noted that solid-state storage 110 may store any type of data that may be utilized by the different illustrative embodiments. Indirection mapping table 124 may be, for example, a hash table that maps a plurality of logical record identifiers to a plurality of physical record row identifiers. In other words, indirection mapping table 124 maps one version-independent logical record identifier to one version-dependent physical record row identifier, both of which correspond to a particular data record stored within data table 120. A version-dependent physical record row identifier is a record identifier that identifies a physical row location within data table 120 where a particular version, such as the most recent version, of a particular data record is stored. In other words, the version-dependent physical record identifier is dependent upon the most recent version within a plurality of different versions of a particular data record stored in data table 120.

In addition, indirection mapping table 124 may be, for example, keyed by logical record identifiers for faster lookups. Logical record identifier indexes 122 point to the logical record identifiers instead of the physical record row identifiers. One possible advantage to this approach is that when performing updating or deleting operations on data records, illustrative embodiments will not propagate the changes to all indexes, but will update indirection mapping table 124 instead.

Further, even though illustrative embodiments may need an extra level of indirection for each data search, the response time of illustrative embodiments is faster and smaller compared to the subsequent magnetic hard disk drive input/output because indirection mapping table 124 is stored on solid-state storage 110. Updates to one column in data table 120 will generate a new version of a row, which will change the version-independent logical recorder identifier to version-dependent physical record row identifier mapping for that particular row. However, it should be noted that illustrative embodiments will only make modification to the logical record identifier index for the changed column. Similarly, illustrative embodiments handle deletions by generating a null physical record row identifier for the corresponding logical record identifier, without any immediate need for updating leaf pages of the associated column index. Illustrative embodiments may still need to update all column indexes when appending data records to the end or "tail" of data table 120, but illustrative embodiments may batch these updates if there are more data record appends than index-dependent data queries. In an alternative illustrative embodiment, all or a portion of indirection mapping table 124 may be cached in memory 106. However, the alternative illustrative embodiment may log any updates on indirection mapping table 124 cached in memory 106 to ensure persistency.

Furthermore, illustrative embodiments provide a method of data record compression, while ensuring that data record query processing by illustrative embodiments can retrieve a data record with a similar number of hard disk drive input/outputs, which is supplemented by an additional solid-state drive input/output, irrespective of the number of versions of the data record that may exist in the hard disk drive. The additional solid-state drive input/output cost is very small in comparison to the hard disk drive input/output cost. For example, one solid-state drive input/output is much less than one hard disk drive input/output in terms of access read time.

Delta blocks 126 represent a plurality of delta blocks stored in solid-state storage 110. A delta block is a block of storage that stores a set of one or more delta changes or updates to values in a set of one or more data records, which are stored in data table 120. Alternatively, a delta block may store a set of one or more pointers that point to locations of delta changes or updates, which are stored in an append-only delta change area of solid-state storage 110. Each delta block may, for example, correspond to a different leaf page within a plurality of leaf pages of an index in logical record identifier indexes 122. Alternatively, a delta block may correspond to one entry in logical record identifier index 122.

Communications unit 112, in this example, provides for communication with other data processing systems and computing devices. Communications unit 112 may provide communications through the use of either or both physical and wireless communications links. The physical communications link may utilize, for example, a wire, cable, universal serial bus, or any other physical technology to establish a physical communications link for data processing system 100. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), or any other wireless communication technology or standard to establish a wireless communications link for data processing system 100.

Input/output unit 114 allows for the input and output of data with other devices that may be connected to data processing system 100. For example, input/output unit 114 may provide a connection for user input through a keypad, a keyboard, a mouse, and/or some other suitable input device. Display 116 provides a mechanism to display information to a user. In addition, display 116 may provide touch screen capabilities.

Instructions for the operating system, applications, and/or programs may be located in storage devices 118, which are in communication with processor unit 104 through communications fabric 102. In this illustrative example, the instructions are in a functional form on persistent storage 108. These instructions may be loaded into memory 106 for running by processor unit 104. The processes of the different embodiments may be performed by processor unit 104 using computer implemented instructions, which may be located in a memory, such as memory 106. These instructions are referred to as program code, computer usable program code, or computer readable program code that may be read and run by a processor in processor unit 104. The program code, in the different embodiments, may be embodied on different physical computer readable storage devices, such as memory 106 or persistent storage 108.

Program code 128 is located in a functional form on computer readable media 130 that is selectively removable and may be loaded onto or transferred to data processing system 100 for running by processor unit 104. Program code 128 and computer readable media 130 form computer program product 132. In one example, computer readable media 130 may be computer readable storage media 134 or computer readable signal media 136. Computer readable storage media 134 may include, for example, an optical or magnetic disc that is inserted or placed into a drive or other device that is part of persistent storage 108 for transfer onto a storage device, such as a magnetic hard disc drive, that is part of persistent storage 108. Computer readable storage media 134 also may take the form of a persistent storage device, such as a hard drive, a thumb drive, or a flash memory that is connected to data processing system 100. In some instances, computer readable storage media 134 may not be removable from data processing system 100.

Alternatively, program code 128 may be transferred to data processing system 100 using computer readable signal media 136. Computer readable signal media 136 may be, for example, a propagated data signal containing program code 128. For example, computer readable signal media 136 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 128 may be downloaded over a network to persistent storage 108 from another device or data processing system through computer readable signal media 136 for use within data processing system 100. For instance, program code stored in a computer readable storage media in a server data processing system may be downloaded over a network from the server to data processing system 100. The data processing system providing program code 128 may be a server computer, a client computer, or some other device capable of storing and transmitting program code 128.

The different components illustrated for data processing system 100 are not meant to provide architectural limitations to the manner in which different embodiments may be implemented. The different illustrative embodiments may be implemented in a data processing system including components in addition to, or in place of, those illustrated for data processing system 100. Other components shown in FIG. 1 can be varied from the illustrative examples shown. The different embodiments may be implemented using any hardware device or system capable of executing program code. As one example, data processing system 100 may include organic components integrated with inorganic components and/or may be comprised entirely of organic components excluding a human being. For example, a storage device may be comprised of an organic semiconductor.

As another example, a computer readable storage device in data processing system 100 is any hardware apparatus that may store data. Memory 106, persistent storage 108, solid-state storage 110, and computer readable storage media 134 are examples of physical computer readable storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

In the course of developing illustrative embodiments, it was discovered that data record insertions, deletions, and updates on a data table triggered input/output to keep the data record indexes current and up to date. With a traditional index structure, the deletion of a data record required the traversal of each index and the removal of the physical record row identifier (RID) from a leaf page of an index containing an entry for the data record. The update of a data record, such as changing one attribute value of the data record to a different value, generated a new version of the data record triggering a traversal of all indexes to change the physical record row identifier to the new version's physical record row identifier. In addition, in the case of a changed attribute value of a data record, the position of an entry corresponding to the data record in the index may also change. For a newly inserted data record, a new physical record row identifier associated with the data record must be inserted into each index. Further, these indexes may be large, and in aggregate, much too large to fit into a random access memory (RAM) buffer pool. As a result, all of the maintenance operations on these indexes will incur the overhead of physical input/output on the storage device. But most importantly, every update results in creation of a new record, which forces the copy and redundant storage of every column in the record including those columns that are not changed. Consequently, the size of the multi-version database grows at a fast rate.

These index maintenance operation overheads have historically been problematic for online transaction processing (OLTP) workloads that are update-intensive. As a result, online transaction processing workloads are often tuned to minimize the number of indexes available. This choice of minimizing the number of available indexes makes it more difficult to efficiently process data queries and to locate data records based on secondary attribute values. These capabilities are often important for operational data stores. For example, it is not uncommon to find tens of indexes to improve analytical and decision-making data queries even in enterprise resource planning (ERP) scenarios.

Illustrative embodiments reduce the overhead of index updates, so that indexes are used effectively for analytical data query processing without being a heavy burden on transaction throughput. Typically, the execution time for analytical data queries is increased as more indexes are added. However, illustrative embodiments by employing an indirection mapping table significantly reduce the incurred index update overhead.

Illustrative embodiments utilize a solid-state storage device to store the indirection mapping table. Solid-state storage devices are orders of magnitude faster than magnetic hard disk drive storage devices for small, random input/outputs. However, per gigabyte, solid-state storage devices are more expensive than magnetic hard disk drive storage devices.

Consequently, illustrative embodiments store the bulk of the data on the magnetic hard disk drive and reserve the solid-state drive for portions of the data that are accessed frequently and randomly.

In contrast to previous approaches, illustrative embodiments do not simply store "hot" data on the solid-state drive, but instead change the data structures in the storage hierarchy to use an extra level of indirection (i.e., a delta block) on solid state storage, which holds the most recent changes or updates to the data records (i.e., the recent deltas to the data records). Using the delta block, illustrative embodiments provide a method to access and reconstruct the latest version of a data record by consulting the delta changes, while reducing and compressing data by periodically flushing the delta changes from the solid-state drive to the hard disk drive. In other words, illustrative embodiments retain every change (or delta) for every data record and avoid redundant storage of unchanged portions of the data records during every update.

Because the solid-state drive is relatively faster, the overhead incurred during index traversal and delta change reconstruction are small. The extra level of indirection using the delta block also substantially reduces the storage footprint for maintaining multiple versions of the same record. Illustrative embodiments only need solid-state drive input/output for data record deletion and update operations, with the exception of indexes on changed data record attribute values. Illustrative embodiments also reduce the magnetic hard disk drive input/output overhead for data record insertions.

Furthermore, it should be noted that even though this specification describes illustrative embodiments using solid-state drives, illustrative embodiments are not restricted to only using solid-state drives. For example, alternative illustrative embodiments may utilize other types of high-speed storage devices, such as an auto-commit memory, with smaller input/output granularities providing increased performance. An auto-commit memory refers to volatile memory that is pre-configured to perform one or more commit actions automatically when triggered by the occurrence of one or more predetermined conditions. In general, a storage-class memory (SCM) may be a candidate for hosting delta blocks including phase-change memory (PCM) technologies.

Further, illustrative embodiments may support multi-version concurrency control (MVCC). Multi-version concurrency control is reviving mostly due to the increased concurrency available in modern hardware, such as large main memories and multi-core processors. However, this increased concurrency comes at the cost of increased locking contention among concurrent read/update data queries, which may be alleviated using optimistic locking over a multi-version database.

Illustrative embodiments organize the data records in a single data table, which contains both current data records and historical data records. Illustrative embodiments append new rows to an end or tail of the data table. Data record updates need to read the data table once and write a new version of the data record to the end of the table. Illustrative embodiments focus on applications that primarily use current data records, but occasionally need to access older versions of the data records. To support data queries over current data records, the most recent version of a data record appears in an index entry.

Thus, illustrative embodiments provide a method, data processing system, and computer program product for managing a multi-version database. A data processing system extends a logical record identifier to physical record row identifier indirection mapping table on a solid-state storage device to include a plurality of delta blocks. In addition, the data processing system maintains a delta block within the plurality of delta blocks for each primary key in a plurality of primary keys associated with a data table on a magnetic hard disk storage device.

Figure 2:
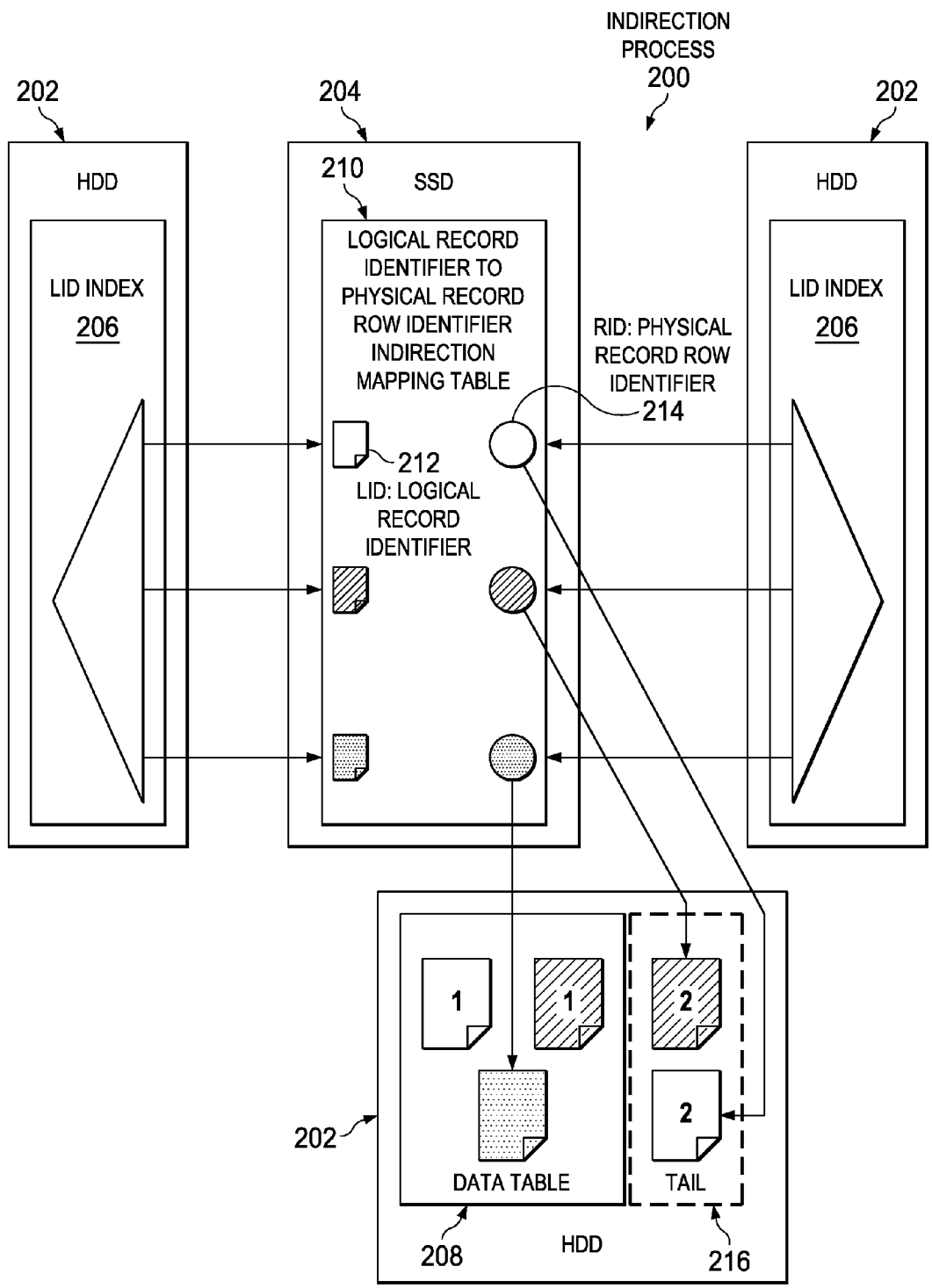
FIG. 2 is a diagram illustrating indirection using an indirection mapping table stored in a solid state storage device in accordance with an illustrative embodiment.

With reference now to FIG. 2, a diagram illustrating indirection using an indirection mapping table stored in a solid state storage device is depicted in accordance with an illustrative embodiment. Indirection process 200 may be implemented in a data processing system, such as data processing system 100 in FIG. 1, for example. Indirection process 200 utilizes hard disk drive 202 and solid-state drive 204. Hard disk drive 202 may be, for example, a magnetic hard disk storage device, such as persistent storage 108 in FIG. 1. Solid-state drive 204 may be, for example, solid-state storage 110 in FIG. 1.

Hard disk drive 202 includes logical record identifier index 206, such as logical record identifier indexes 122 in FIG. 1. Logical record identifier index 206 includes entries corresponding to a plurality of data records within data table 208, such as data table 120 in FIG. 1, which are stored in hard disk drive 202. Solid-state drive 204 includes logical record identifier to physical record row identifier indirection mapping table 210, such as indirection mapping table 124 in FIG. 1. Logical record identifier to physical record row identifier indirection mapping table 210 includes logical record identifier 212 and physical record row identifier 214 for each data record entry in logical record identifier index 206.

Traditional index structures directly reference a data record in data table 208 via physical record row identifier 214 only. Physical record row identifier 214 typically encodes a combination of a database partition identifier, a page number within the partition, and a row number within the page where the data record is stored. However, only using physical record row identifier 214 to reference a data record hinders the update performance of a multi-version database in which updates result in a new physical location for an updated data record. Changes to the data record induce hard disk drive input/output for every index, even indexes on "unaffected" attribute values that have not changed. Random input/outputs are required to modify hard disk drive-resident leaf pages.

To avoid hard disk drive input/output for indexes on unaffected attribute values, indirection process 200 decouples the physical and logical representations of data records spanning a plurality of versions. Indirection process 200 distinguishes between physical record row identifier 214 and logical record identifier 212, which correspond to a particular data record. For any given data record, a plurality of physical record row identifiers may exist for multiple versions of a particular data record. Each of the plurality of physical row identifiers for a particular data record corresponds to a physical location of a different version of that particular data record within the data table.

In contrast, indirection process 200 utilizes logical record identifier 212, which corresponds to one physical record row identifier 214 representing the most recent version of the data record. In addition, indirection process 200 utilizes logical record identifier 212 as a primary key in logical record identifier to physical record row identifier indirection mapping table 210. As a result, indirection process 200 may now reference version-independent logical record identifiers within indexes stored in hard disk drive 202 rather than referencing version-dependent physical record row identifiers in leaf pages of the indexes.

Indirection process 200 utilizes logical record identifier to physical record row identifier indirection mapping table 210 stored in solid-state drive 204 to convert logical record identifier 212 to physical record row identifier 214 during a traversal of logical record identifier index 206 stored in hard disk drive 202. Indirection process 200 treats a missing logical record identifier or a logical record identifier with a corresponding null physical record row identifier in logical record identifier to physical record row identifier indirection mapping table 210 as a deleted row and ignores these entries during a search for data records. By placing logical record identifier to physical record row identifier indirection mapping table 210 on solid-state drive 204, indirection process 200 ensures that the solid-state drive input/output overhead for the extra indirection is relatively small. Because solid-state drive 204 is a persistent storage device, logical record identifier to physical record row identifier indirection mapping table 210 can be recovered after a computer crash. Further, because indirection process 200 only needs a few solid-state drive bytes per data record, it is possible to handle a large magnetic disk drive footprint with a much smaller solid-state drive footprint.

When an existing data record is modified, a new version of that data record is generated. Consequently, indirection process 200 updates logical record identifier to physical record row identifier indirection mapping table 210 to associate the physical record row identifier for the new row in data table 208 containing the new version of the data record to the existing logical record identifier corresponding to that data record. As a result, indexes on unchanged attribute values remain valid. Thus, indirection process 200 only requires index input/output for the changed attribute value.

When a data record is deleted, indirection process 200 deletes the logical record identifier/physical record row identifier pair for that particular data record from logical record identifier to physical record row identifier indirection mapping table 210. Index traversals ignore missing logical record identifiers. Indexes may update their leaf pages during traversal, when a read input/output is performed. At that time, when missing logical record identifiers are encountered, indirection process 200 removes those logical record identifiers from the index leaf pages. After a long period of activity, indexes should be validated offline against logical record identifier to physical record row identifier indirection mapping table 210 to remove deleted logical record identifiers that subsequently have not been searched for.

When a new data record is added, indirection process 200 appends or adds the new data record to tail 216 of data table 208. Then, indirection process 200 determines the physical record row identifier associated with the location of the new data record within tail 216 and associates the determined physical record row identifier with a newly generated logical record identifier that corresponds to the new data record. Indirection process 200 also adds the logical record identifier/physical record row identifier pair for the new data record to logical record identifier to physical record row identifier indirection mapping table 210. In addition, indirection process 200 updates logical record identifier index 206 with the new logical record identifier corresponding to the new data record.

Figure 3:
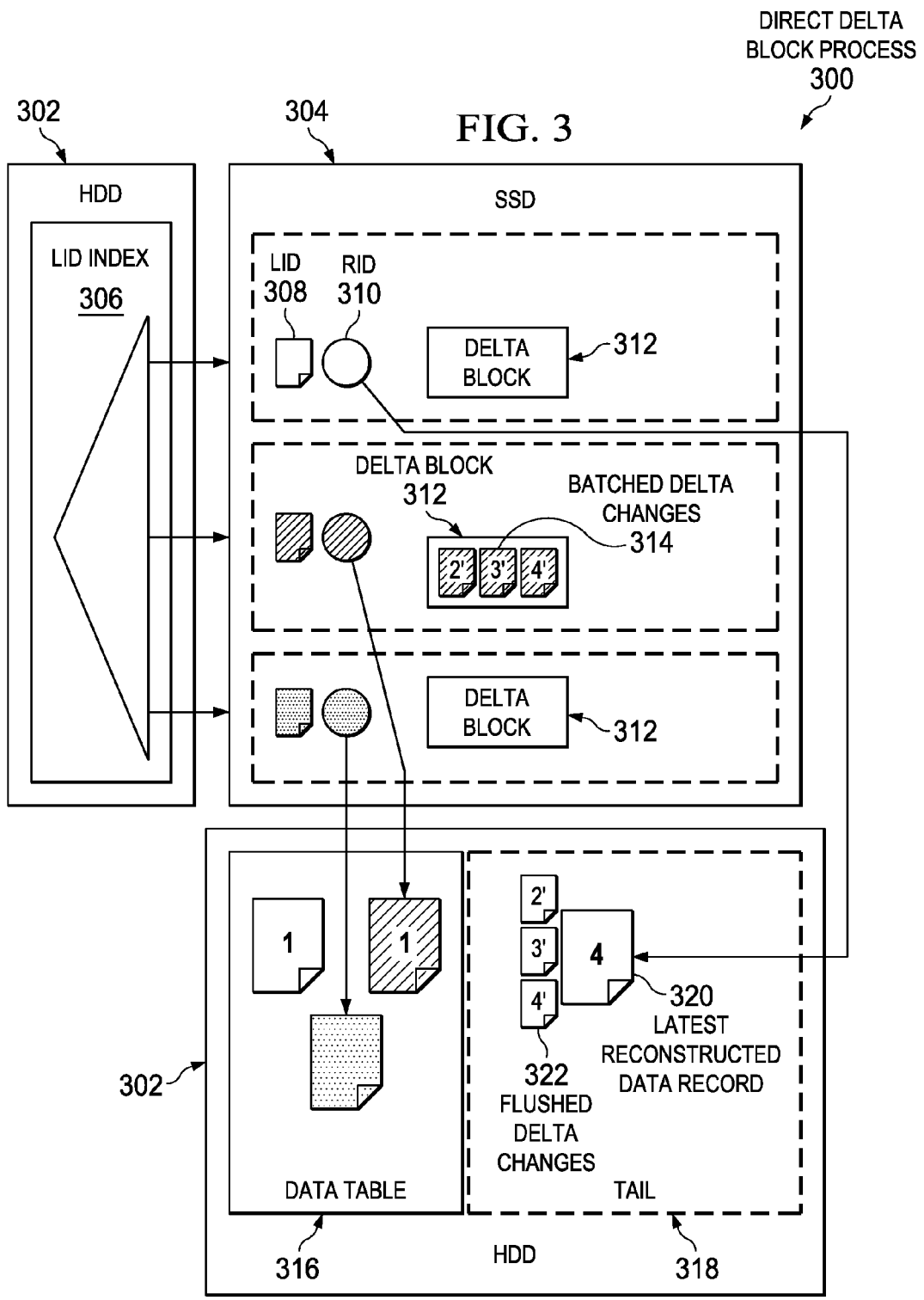
FIG. 3 is a diagram illustrating a direct delta block process in accordance with an illustrative embodiment.

With reference now to FIG. 3, a diagram illustrating a direct delta block process is depicted in accordance with an illustrative embodiment. Direct delta block process 300 may be implemented in a data processing system, such as data processing system 100 in FIG. 1, for example. Direct delta block process 300 utilizes hard disk drive 302 and solid-state drive 304. Hard disk drive 302 may be, for example, a magnetic hard disk storage device, such as persistent storage 108 in FIG. 1. Solid-state drive 304 may be, for example, solid-state storage 110 in FIG. 1.

Hard disk drive 302 includes logical record identifier index 306, such as logical record identifier indexes 122 in FIG. 1. Logical record identifier index 306 includes entries corresponding to a plurality of data records within data table 316, such as data table 120 in FIG. 1, which is stored in hard disk drive 302. Solid-state drive 304 includes logical record identifier (LID) 308, physical record row identifier (RID) 310, and delta block 312. Logical record identifier 308 and physical record row identifier 310 may be located in, for example, a logical record identifier to physical record row identifier indirection mapping table, such as indirection mapping table 124 in FIG. 1. The logical record identifier to physical record row identifier indirection mapping table includes logical record identifier 308 and physical record row identifier 310 for each data record entry in logical record identifier index 306. Delta block 312 may be, for example, delta blocks 126 in FIG. 1. Delta block 312 contains a set of one or more recent delta changes to a data record stored in data table 316.

To improve space utilization on hard disk drive 302, direct delta block process 300 utilizes delta block 312 to exploit overlap among different versions of the same data record. In managing and storing unchangeable versions of a data record there tends to be a large overlap between consecutive versions of that data record. For example, typically only a small set of attribute values within the data record is changed during transaction processing workloads. Existing multi-version databases fail to exploit this overlap and redundantly store the unchanged portions of the data record for every version. In addition, these existing multi-version databases rely on expensive and offline compression of the data records, which is not an adequate solution for many online settings. The lack of proactive compression of the multiple versions of the data records results in database size growth at a much faster rate as compared to traditional single-version database stores using in-place updates. In a worst case scenario, the size of a multi-version database grows linearly with an average number of versions of each data record.

To address this shortcoming of existing multi-version databases, direct delta block process 300 utilizes delta block 312 to enable fast data record compression and decompression, which exploits overlap among consecutive versions of a data record and utilizes the fast random data access property of solid-state drive 304. A design feature of delta block 312 is the avoidance of changing the input/output pattern of hard disk drive 302 during data record query processing and data record update processing. Direct delta block process 300 facilitates this avoidance of changing the input/output pattern of hard disk drive 302 by ensuring that the latest version of any record is retrievable with at most one hard disk drive 302 input/output and one solid-state drive 304 input/output. It should be noted that the cost of the one additional solid-state drive 304 input/output is negligible with regard to the one hard disk drive 302 input/output.

For each data record represented by a logical record identifier, such as logical record identifier 308, direct delta block process 300 batches in delta block 312 all the recent delta changes between consecutive versions of a data record, such as batched delta changes 314. In addition, direct delta block process 300 flushes a set of delta changes for a data record, such as flushed delta changes 322, to hard disk drive 302 when direct delta block process 300 determines that the data record's corresponding delta block 312 is full. Direct delta block process 300 may place flushed delta changes 322 in a location at an end of data table 316, such as tail 318.

Further, whenever direct delta block process 300 flushes batched delta changes 314 to hard disk drive 302, direct delta block process 300 also reconstructs the latest version of the corresponding data record, such as latest reconstructed data record 320, given the recent set of flushed delta changes 322.

Direct delta block process 300 also may place latest reconstructed data record 320 in a location within tail 318. The flushing of latest reconstructed data record 320 to tail 318 fulfills a key design principle of retrieving any data record with at most one hard disk drive 302 input/output. Also, storing all the recent delta changes of a data record together with the latest version of the data record satisfies a second key design principle of retrieving the latest "k" number of versions of the data record with at most one hard disk drive 302 input/output. After reconstructing and flushing latest reconstructed data record 320, direct delta block process 300 also updates the logical record identifier to physical record row identifier indirection table to point to physical record row identifier 310, which corresponds to the location of latest reconstructed data record 320 within tail 318.

Direct delta block process 300 may store delta block 312 by extending the logical record identifier to physical record row identifier indirection table to include delta block 312. Alternatively, direct delta block process 300 may store delta block 312 as a separate table or a hash table structure within solid-state drive 304.

Figure 4:
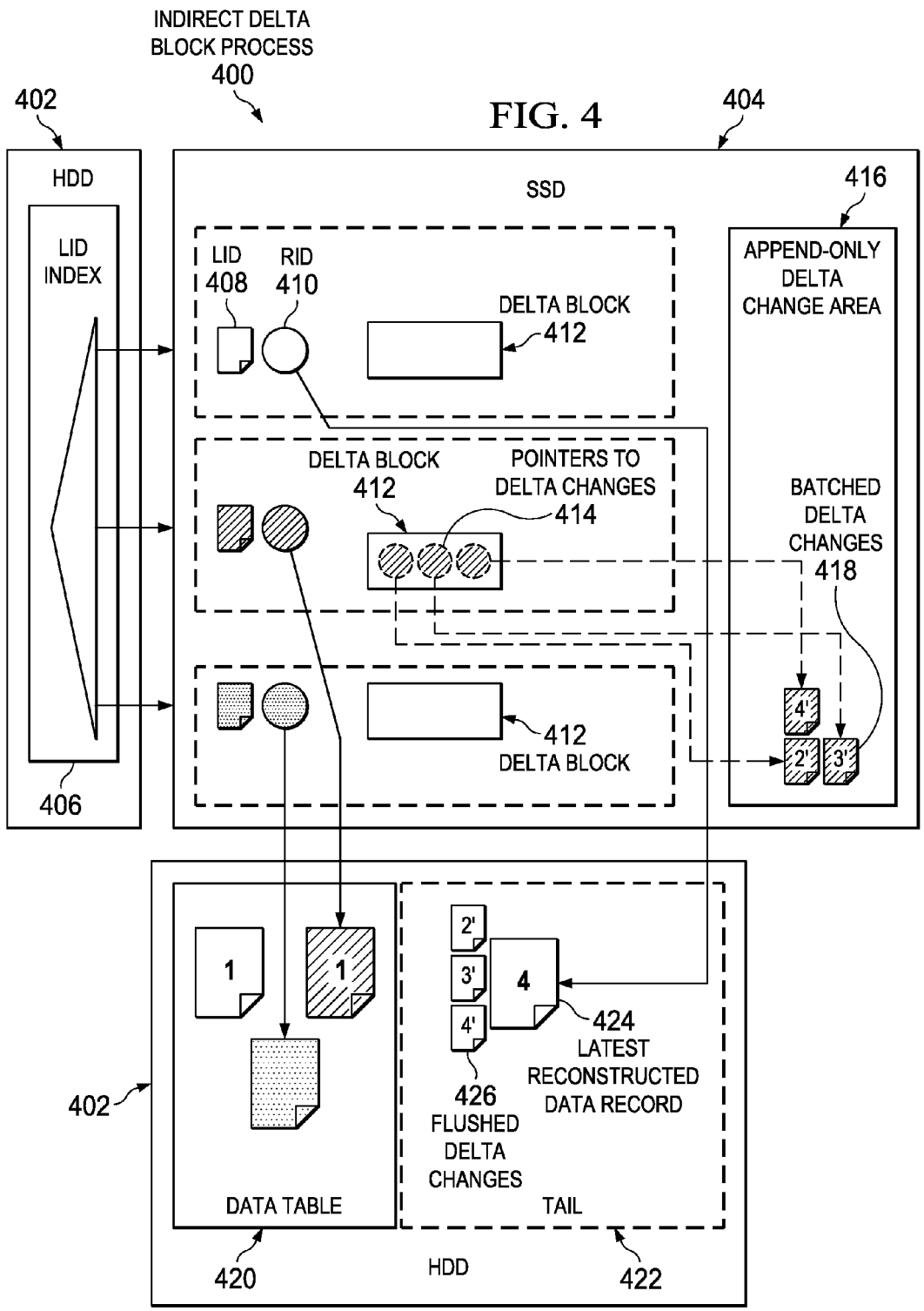
FIG. 4 is a diagram illustrating an indirect delta block process in accordance with an illustrative embodiment.

With reference now to FIG. 4, a diagram illustrating an indirect delta block process is depicted in accordance with an illustrative embodiment. Indirect delta block process 400 may be implemented in a data processing system, such as data processing system 100 in FIG. 1, for example. Indirect delta block process 400 utilizes hard disk drive 402 and solid-state drive 404. Hard disk drive 402 may be, for example, hard disk drive 302 in FIG. 3. Solid-state drive 404 may be, for example, solid-state drive 304 in FIG. 3.

Hard disk drive 402 includes logical record identifier index 406, such as logical record identifier index 306 in FIG. 3. Solid-state drive 404 includes logical record identifier 408, physical record row identifier 410, and delta block 412, such as logical record identifier 308, physical record row identifier 310, and delta block 312 in FIG. 3. Logical record identifier 408 and physical record row identifier 410 may be located in, for example, a logical record identifier to physical record row identifier indirection mapping table, such as indirection mapping table 124 in FIG. 1. Delta block 412 contains a set of pointers, such as pointers to delta changes 414, which point to locations of batched delta changes 418 that are stored in append-only delta change area 416 of solid-state drive 404.

Instead of extending the logical record identifier to physical record row identifier indirection mapping table with sufficient space, which may be determined by observing the past update history and information derived from a schema, to hold up to a predetermined number of delta changes for a corresponding data record as shown in the example of direct delta block process 300 in FIG. 3, indirect delta block process 400 allocates sufficient space in delta block 412 to hold only pointers to recent delta changes of data records stored on solid-state drive 404. Indirect delta block process 400 maintains the recent delta changes for all data records in append-only delta change area 416. Thus, indirect delta block process 400 promotes fast sequential writes on solid-state drive 404 and simplifies the task of determining the space needed for delta block 412.

For each data record represented by a logical record identifier, such as logical record identifier 408, indirect delta block process 400 batches in delta block 412 all the points to delta changes 414 between consecutive versions of a data record, such as batched delta changes 418. In addition, indirect delta block process 400 flushes a set of delta changes for a data record, such as flushed delta changes 426, to hard disk drive 402 when indirect delta block process 300 determines that the data record's corresponding delta block 412 is full. Indirect delta block process 400 may place flushed delta changes 426 in a location at an end of data table 420, such as tail 422.

Further, whenever indirect delta block process 400 flushes batched delta changes 418 to hard disk drive 402, indirect delta block process 400 also reconstructs the latest version of the corresponding data record, such as latest reconstructed data record 424, given the recent set of flushed delta changes 426. Indirect delta block process 400 also may place latest reconstructed data record 424 in a location within tail 422. After reconstructing and flushing latest reconstructed data record 424, indirect delta block process 400 also updates the logical record identifier to physical record row identifier indirection table to point to physical record row identifier 410, which corresponds to the location of latest reconstructed data record 424 within tail 422.

Indirect delta block process 400 may independently tune the size of delta block 412 for each data record, for example. The size of delta block 412 may be based on, for example, a fixed pointer size associated with each delta change and a desired number of delta changes to be included in delta block 412. Using indirect delta block process 400, data reads are still limited to at most one hard disk drive 402 input/output and at most a constant number of solid-state drive 404 input/outputs based on a maximum number of pointers to delta changes 414 that must be followed within each delta block 412.

Figure 5:
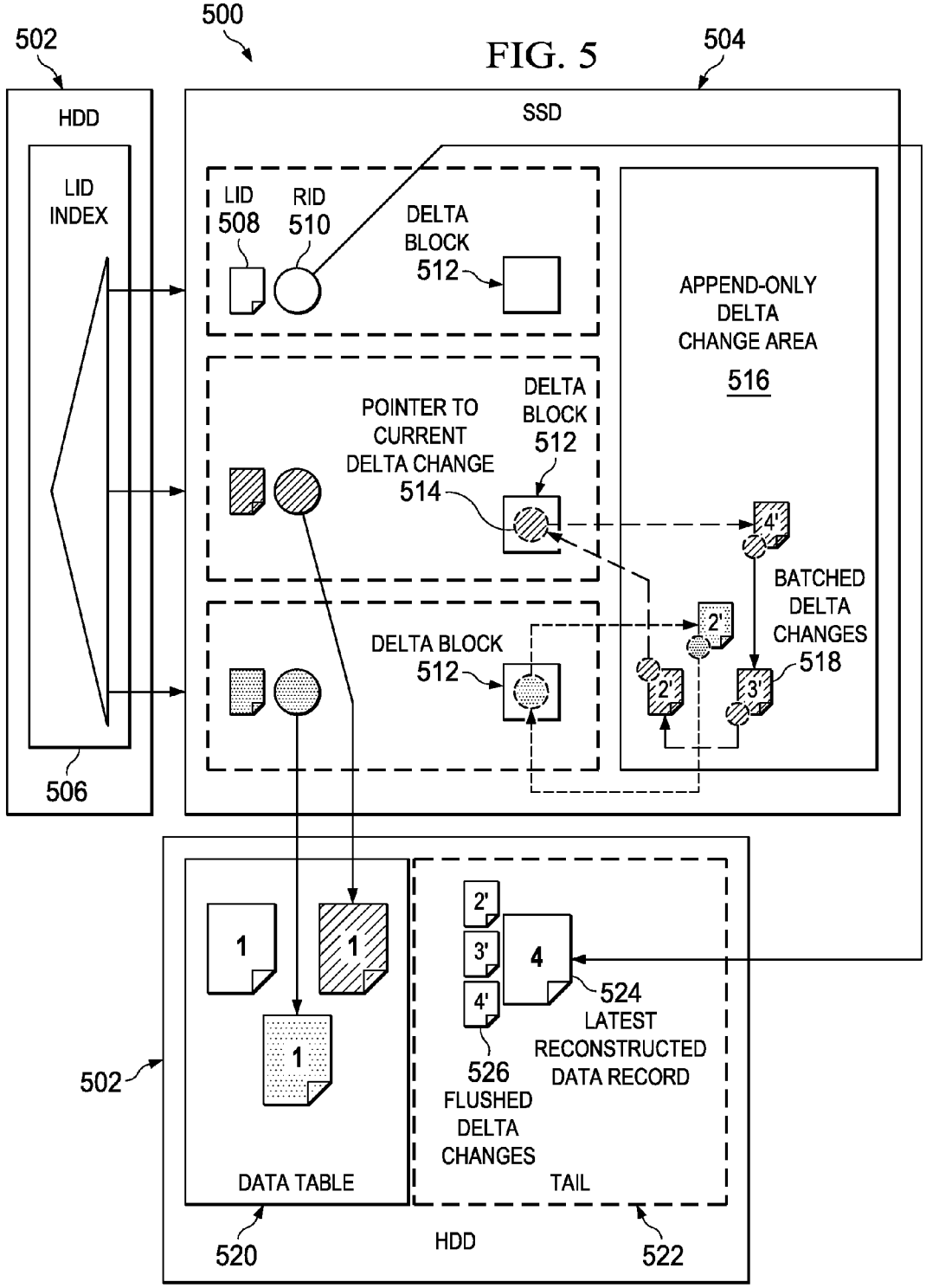
FIG. 5 is a diagram illustrating an indirect delta block process with chaining in accordance with an illustrative embodiment.

With reference now to FIG. 5, a diagram illustrating an indirect delta block process with chaining is depicted in accordance with an illustrative embodiment. Indirect delta block process with chaining 500 may be implemented in a data processing system, such as data processing system 100 in FIG. 1, for example. Indirect delta block process with chaining 500 utilizes hard disk drive 502 and solid-state drive 504. Hard disk drive 502 may be, for example, hard disk drive 402 in FIG. 4. Solid-state drive 504 may be, for example, solid-state drive 404 in FIG. 4.

Hard disk drive 502 includes logical record identifier index 506, such as logical record identifier index 406 in FIG. 4. Solid-state drive 504 includes logical record identifier 508, physical record row identifier 510, and delta block 512, such as logical record identifier 408, physical record row identifier 410, and delta block 412 in FIG. 4. Logical record identifier 508 and physical record row identifier 510 may be located in, for example, a logical record identifier to physical record row identifier indirection mapping table, such as indirection mapping table 124 in FIG. 1. Delta block 512 contains a pointer, such as pointer to current delta change 514, which points to a location of a most recent delta change of a corresponding data record stored in append-only delta change area 516 of solid-state drive 504.

Instead of extending the logical record identifier to physical record row identifier indirection mapping table with sufficient space to hold up to a predetermined number of delta change pointers for a corresponding data record as shown in the example of indirect delta block process 400 in FIG. 4, indirect delta block process with chaining 500 allocates sufficient space in delta block 512 to hold only one pointer to the most recent delta change. Indirect delta block process with chaining 500 maintains the recent delta changes for all data records in append-only delta change area 516.

For each delta block 512, indirect delta block process with chaining 500 only requires to pre-allocate at most one fixed pointer size in delta block 512 to the last delta change stored on solid-state drive 504. As in indirect delta block process 400 in FIG. 4, indirect delta block process with chaining 500 continues to batch all recent delta changes to data records, such as batched delta changes 518, in append-only delta change area 516 on solid-state drive 504. In indirect delta block process with chaining 500, the only fixed-size pointer contained in delta block 512 points to the last delta change for its corresponding data record.

Further, each delta change stored in append-only delta change area 516 also includes a pointer that points to a location of its previous delta change associated with the corresponding data record. In this way, indirect delta block process with chaining 500 chains together all of the recent delta changes for a single record. Thus, indirect delta block process with chaining 500 is able to follow a pointer located in delta block 512 to the last delta change corresponding to a data record and then from the last delta change follow the pointers to retrieve all the delta changes in the chain associated with the corresponding data record. As a result, indirect delta block process with chaining 500 is a very flexible technique, which adapts to workload accommodating both frequently updated and rarely updated data records, without the need to predetermine the space needed for (i.e., the size of) delta block 512.

Unlike the approaches of direct delta block process 300 in FIG. 3 and indirect delta block process 400 in FIG. 4 above, only when dedicated append-only delta change area 516 is full of delta changes does indirect delta block process with chaining 500 flush batched delta changes 518 to tail 522 of data table 520, such as flushed delta changes 526. In contrast, direct delta block process 300 in FIG. 3 and indirect delta block process 400 in FIG. 4 flush on a record by record basis.

Indirect delta block process with chaining 500 starts by following pointer to current delta change 514 to the location of the last or current delta change corresponding to a particular data record stored on solid-state drive 504. Then, indirect delta block process with chaining 500 follows the pointer included with the last delta change stored on solid-state drive 504 to retrieve a previous delta change corresponding to the particular data record. Further, indirect delta block process with chaining 500 follows the pointer included with the previous delta change, if any, to a next previous delta change, and so on until indirect delta block process with chaining 500 retrieves all delta changes for the particular data record. The first or earliest delta change in the chain of delta changes corresponding to the particular data record includes a pointer to the corresponding delta block 512.

As a result, indirect delta block process with chaining 500 arrives at the data record's delta block 512 from which indirect delta block process with chaining 500 accesses the data record stored on hard disk drive 502 using physical record row identifier 510 associated with the data record's delta block 512. Now, indirect delta block process with chaining 500 is in a position to reconstruct the latest version of the data record, such as latest reconstructed data record 524, and flush latest reconstructed data record 524 and all its corresponding delta changes from solid-state drive 504 to hard disk drive 502. Indirect delta block process with chaining 500 flushes the latest version of the data record to hard disk drive 502 in a reverse order (i.e., earliest to latest). Thus after indirect delta block process with chaining 500 flushes all the delta changes, such as flushed delta changes 526, the last record on hard disk drive 502 is the record containing the most recent updates applied to the multi-version database. In addition, indirect delta block process with chaining 500 marks all of these fetched delta changes as visited using, for example, a bit.

Similar to indirect delta block process 400 in FIG. 4, indirect delta block process with chaining 500 requires a fixed size to delta block 512, which is large enough to only store a single pointer. Using indirect delta block process with chaining 500, the data reads are still limited to at most one hard disk drive 502 input/output and at most a constant number of solid-state drive 504 input/outputs based on a maximum number of delta change pointers that must be followed in the chain of delta changes.

Figure 6:
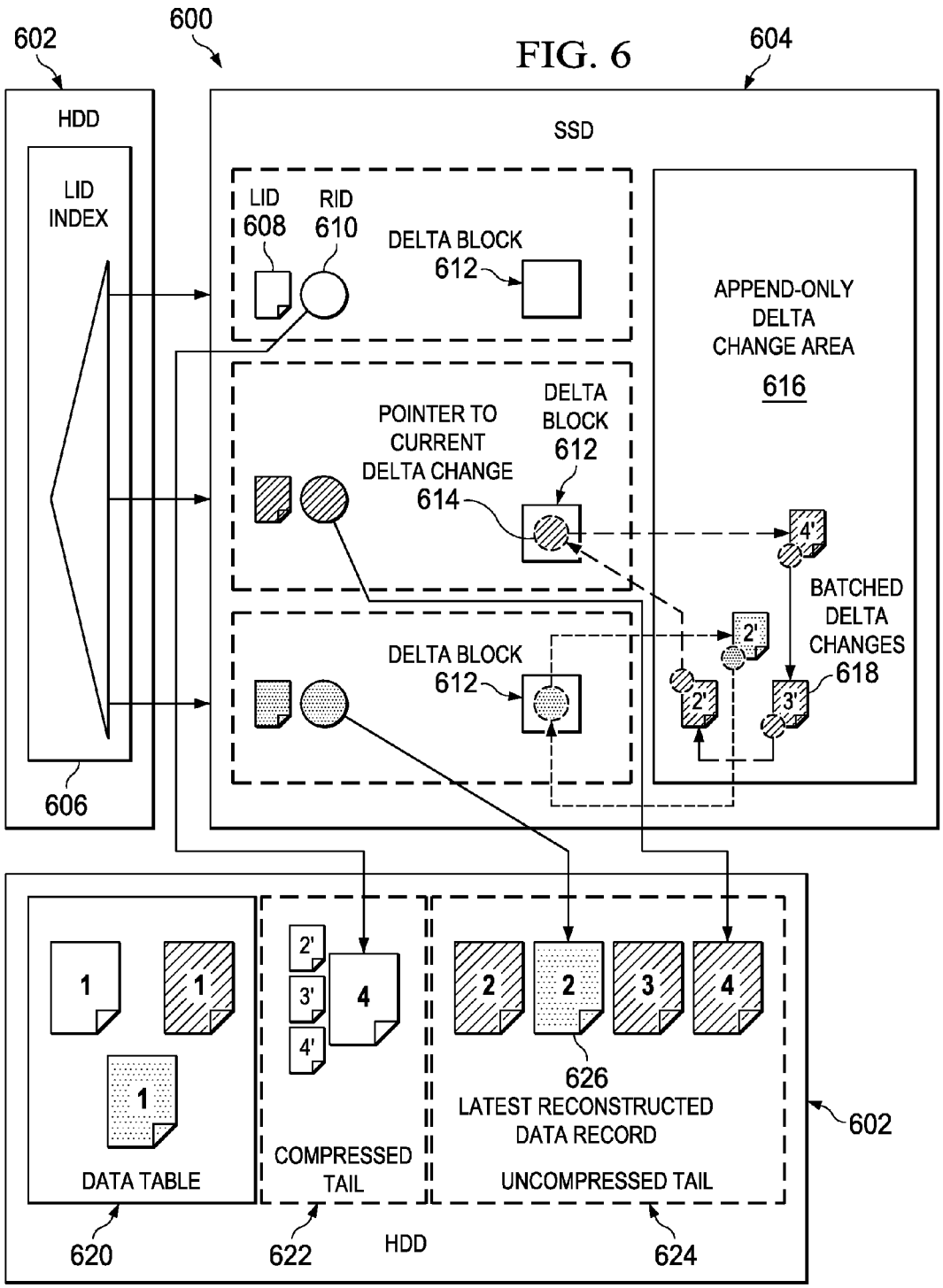
FIG. 6 is a diagram illustrating an indirect delta block process with chaining and deferred compression in accordance with an illustrative embodiment.

With reference now to FIG. 6, a diagram illustrating an indirect delta block process with chaining and deferred compression is depicted in accordance with an illustrative embodiment. Indirect delta block process with chaining and deferred compression 600 may be implemented in a data processing system, such as data processing system 100 in FIG. 1, for example. Indirect delta block process with chaining and deferred compression 600 utilizes hard disk drive 602 and solid-state drive 604. Hard disk drive 602 may be, for example, hard disk drive 502 in FIG. 5. Solid-state drive 604 may be, for example, solid-state drive 504 in FIG. 5.

Hard disk drive 602 includes logical record identifier index 606, such as logical record identifier index 506 in FIG. 5. Solid-state drive 604 includes logical record identifier 608, physical record row identifier 610, and delta block 612, such as logical record identifier 508, physical record row identifier 510, and delta block 512 in FIG. 5. Logical record identifier 608 and physical record row identifier 610 may be located in, for example, a logical record identifier to physical record row identifier indirection mapping table, such as indirection mapping table 124 in FIG. 1. Delta block 612 contains pointer to current delta change 614, which points to a location of a most recent delta change of a corresponding data record stored in append-only delta change area 616 of solid-state drive 604.

Indirect delta block process with chaining and deferred compression 600 eliminates the need for following a chain of delta changes during data record read operations. In other words, latest reconstructed data record 626 of a particular data record is always available on hard disk drive 602. Indirect delta block process with chaining and deferred compression 600 points to latest reconstructed data record 626 using the logical record identifier to physical record row identifier indirection mapping table, which enables a single hard disk drive 602 input/output and zero solid-state drive 604 input/outputs to reconstruct the data record. Indirect delta block process with chaining and deferred compression 600 enables fast data record scanning without consulting solid-state drive 604 either for the indirection table or delta blocks.

The tail of data table 620 includes two areas: compressed tail 622 and uncompressed tail 624. Indirect delta block process with chaining and deferred compression 600 utilizes uncompressed tail 624 to store and retrieve the latest version of a recently updated data record, such as latest reconstructed data record 626. The individual delta changes for a recently updated data record appearing in uncompressed tail 624 also are stored in append-only delta change area 616. Indirect delta block process with chaining and deferred compression 600 maintains delta block 612 and batched delta changes 618 similar to indirect delta block process with chaining 500 in FIG. 5 above. However, indirect delta block process with chaining and deferred compression 600 is different with regard to flushing and subsequent data record compression.

Whenever indirect delta block process with chaining and deferred compression 600 determines that append-only delta change area 616 is full, then indirect delta block process with chaining and deferred compression 600 compresses uncompressed tail 624 regarding the data records corresponding to batched delta changes 618 on solid-state drive 604. For example, indirect delta block process with chaining and deferred compression 600 deletes versions 2 and 3 associated with version 4 in uncompressed tail 624 because version 4 is the most recent reconstructed version of the data record corresponding to batched delta changes 618. In addition, indirect delta block process with chaining and deferred compression 600 fetches batched delta changes 618 and reconstructs the latest version of a data record. Further, indirect delta block process with chaining and deferred compression 600 flushes latest reconstructed data record 626 and batched delta changes 618 onto compressed tail 622 in reverse order (i.e., earliest to latest) as described above. Alternatively, indirect delta block process with chaining and deferred compression 600 can avoid reconstructing the latest version of the data record because latest reconstructed data record 626 already is available on hard disk drive 602. It should be noted that the order of delta changes on solid-state drive 604 is identical to the order of data records in uncompressed tail 624 of data table 620, which allows simple re-use of an already reconstructed latest version of a data record on hard disk drive 602.

Figure 7:
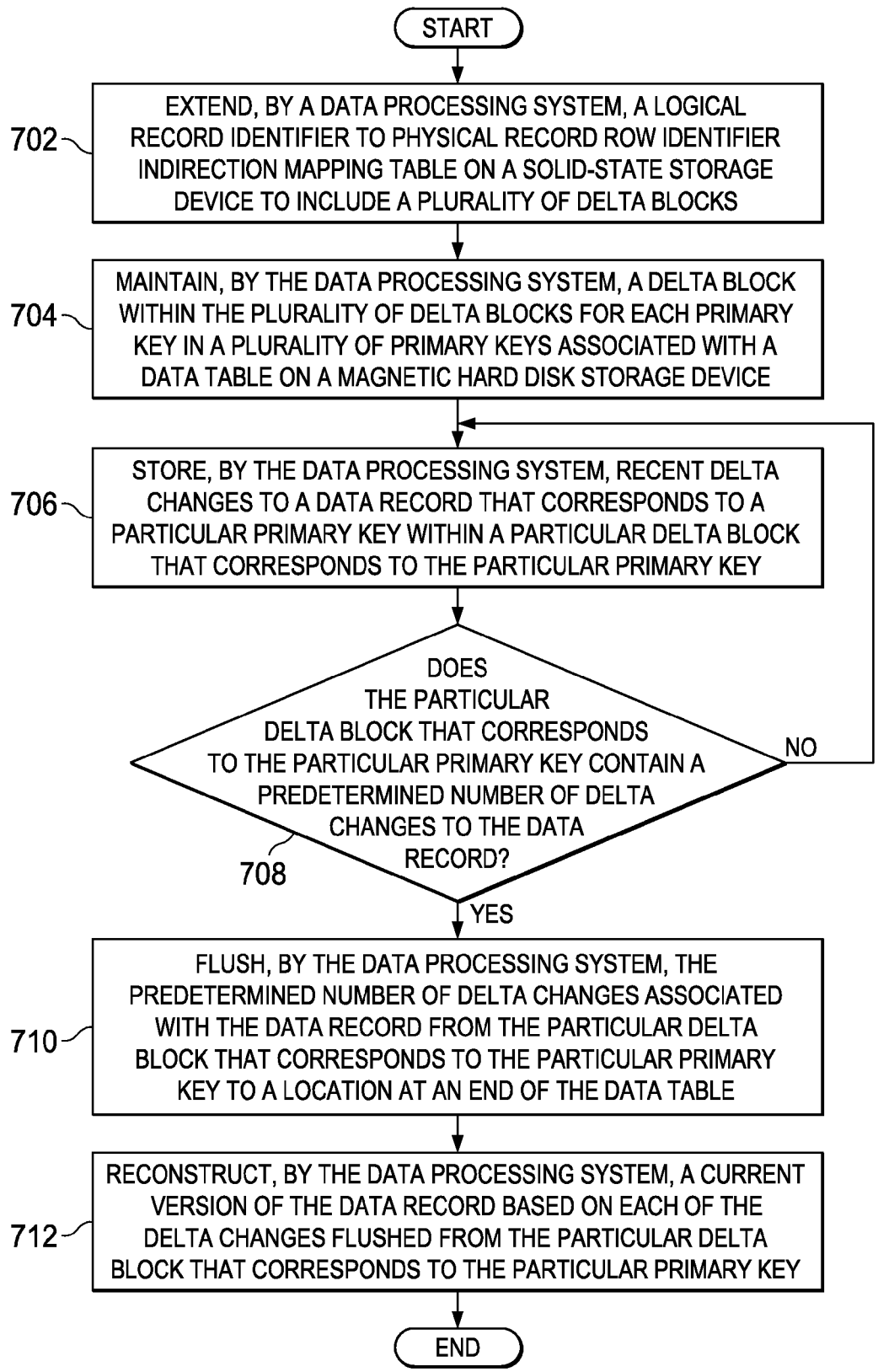
FIG. 7 is a flowchart illustrating a process for compressing a multi-version database in accordance with an illustrative embodiment.

With reference now to FIG. 7, a flowchart illustrating a process for compressing a multi-version database is shown in accordance with an illustrative embodiment. The process shown in FIG. 7 may be implemented in a data processing system, such as, for example, data processing system 100 in FIG. 1.

The process begins when the data processing system extends a logical record identifier to physical record row identifier indirection mapping table on a solid-state storage device, such as logical record identifier to physical record row identifier indirection mapping table 210 in FIG. 2, to include a plurality of delta blocks, such as delta blocks 312 in FIG. 3 (step 702). The data processing system maintains a delta block within the plurality of delta blocks for each primary key in a plurality of primary keys associated with a data table on a magnetic hard disk storage device, such as data table 208 on hard disk drive 202 in FIG. 2 (step 704). In addition, the data processing system stores recent delta changes to a data record that corresponds to a particular primary key within a particular delta block that corresponds to the particular primary key (step 706). The recent delta changes may be, for example, batched delta changes 314 in FIG. 3.

Subsequently, the data processing system makes a determination as to whether the particular delta block that corresponds to the particular primary key contains a predetermined number of delta changes to the data record (step 708). If the data processing system determines that the particular delta block that corresponds to the particular primary key does not contain the predetermined number of delta changes to the data record, no output of step 708, then the process returns to step 706 where the data processing system continues to store recent delta changes to the data record that corresponds to the particular primary key within the particular delta block that corresponds to the particular primary key. If the data processing system determines that the particular delta block that corresponds to the particular primary key does contain the predetermined number of delta changes to the data record, yes output of step 708, then the data processing system flushes the predetermined number of delta changes associated with the data record from the particular delta block that corresponds to the particular primary key to a location at an end of the data table, such as tail 318 in FIG. 3 (step 710). Further, the data processing system reconstructs a current version of the data record, such as latest reconstructed data record 320 in FIG. 3, based on each of the delta changes flushed from particular delta block that corresponds to the particular primary key, such as flushed delta changes 322 in FIG. 3 (step 712).

Figure 8A:
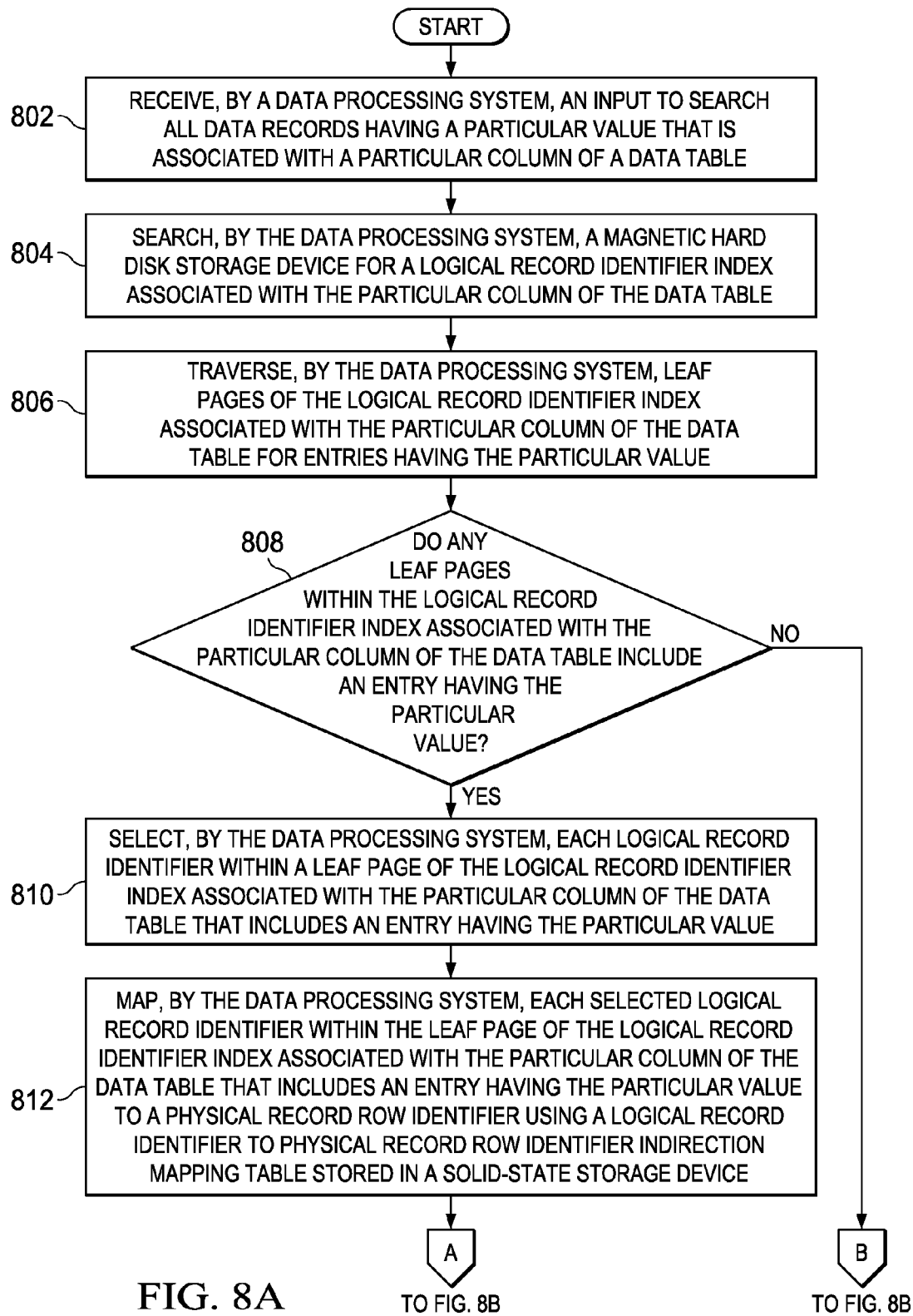
FIGS. 8A-8B are a flowchart illustrating a process for searching data records in a relational data table using a direct delta block process in accordance with an illustrative embodiment.
Figure 8B:
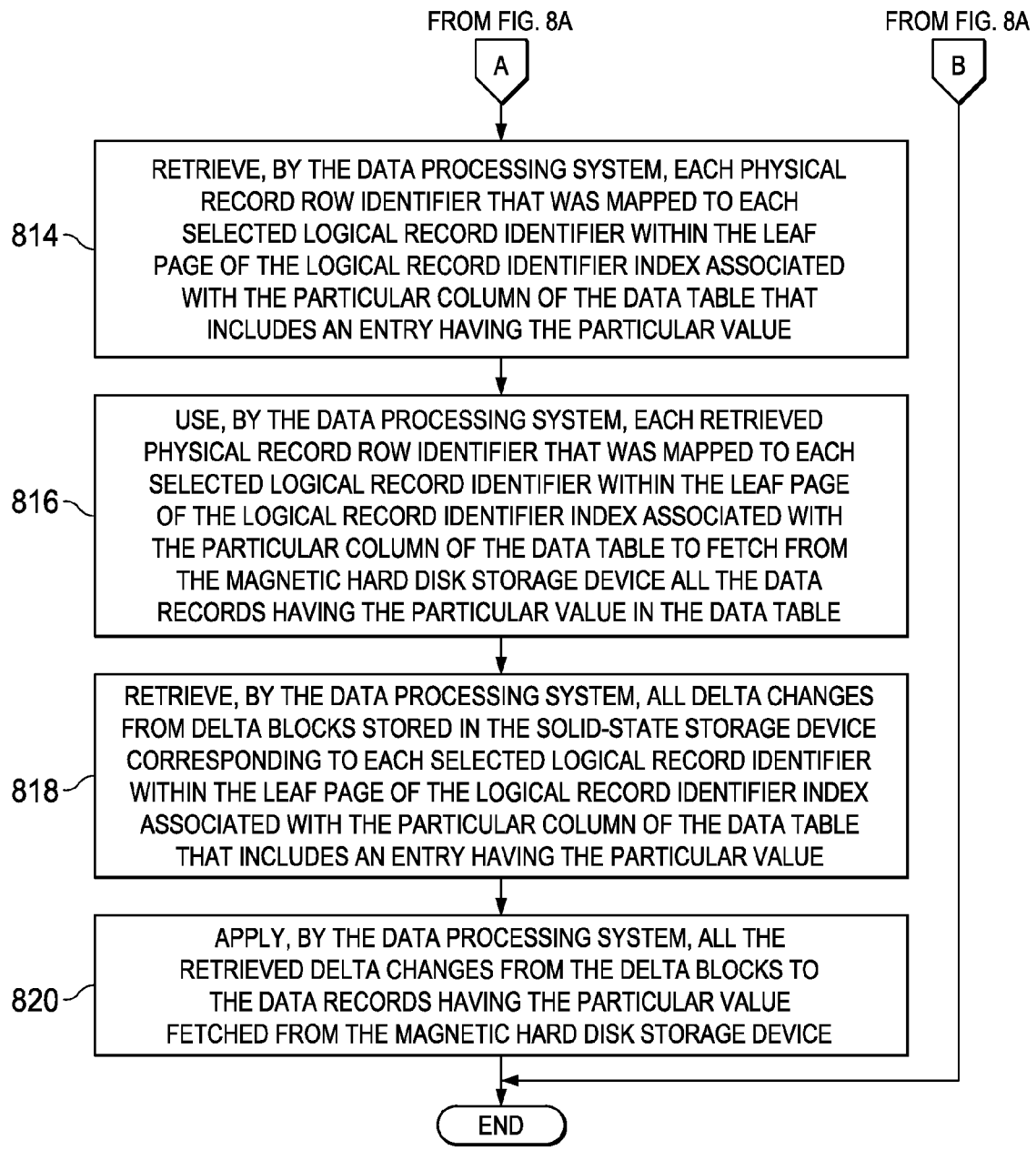

With reference now to FIGS. 8A-8B, a flowchart illustrating a process for searching data records in a relational data table using a direct delta block process is shown in accordance with an illustrative embodiment. The process shown in FIGS. 8A-8B may be implemented in a data processing system, such as, for example, data processing system 100 in FIG. 1.

The process begins when the data processing system receives an input to search all data records having a particular value that is associated with a particular column of a data table (step 802). Afterward, the data processing system searches a magnetic hard disk storage device for a logical record identifier index associated with the particular column of the data table (step 804). In addition, the data processing system traverses leaf pages of the logical record identifier index associated with the particular column of the data table for entries having the particular value (step 806).

Subsequently, the data processing system makes a determination as to whether any leaf pages within the logical record identifier index associated with the particular column of the data table include an entry having the particular value (step 808). If the data processing system determines that no leaf pages within the logical record identifier index associated with the particular column of the data table include an entry having the particular value, no output of step 808, then the process terminates thereafter. If the data processing system determines that leaf pages within the logical record identifier index associated with the particular column of the data table do include an entry having the particular value, yes output of step 808, then the data processing system selects each logical record identifier within a leaf page of the logical record identifier index associated with the particular column of the data table that includes an entry having the particular value (step 810).

Afterward, the data processing system maps each selected logical record identifier within the leaf page of the logical record identifier index associated with the particular column of the data table that includes an entry having the particular value to a physical record row identifier using a logical record identifier to physical record row identifier indirection mapping table stored in a solid-state storage device (step 812). Then, the data processing system retrieves each physical record row identifier that was mapped to each selected logical record identifier within the leaf page of the logical record identifier index associated with the particular column of the data table that includes an entry having the particular value (step 814). Further, the data processing system uses each retrieved physical record row identifier that was mapped to each selected logical record identifier within the leaf page of the logical record identifier index associated with the particular column of the data table to fetch from the magnetic hard disk storage device all the data records having the particular value in the data table (step 816).

In addition, the data processing system retrieves all delta changes from delta blocks stored in the solid-state storage device corresponding to each selected logical record identifier within the leaf page of the logical record identifier index associated with the particular column of the data table that includes an entry having the particular value (step 818). Then, the data processing system applies all the retrieved delta changes from the delta blocks to the data records having the particular value fetched from the magnetic hard disk storage device (step 820). Thereafter, the process terminates.

Figure 9A:
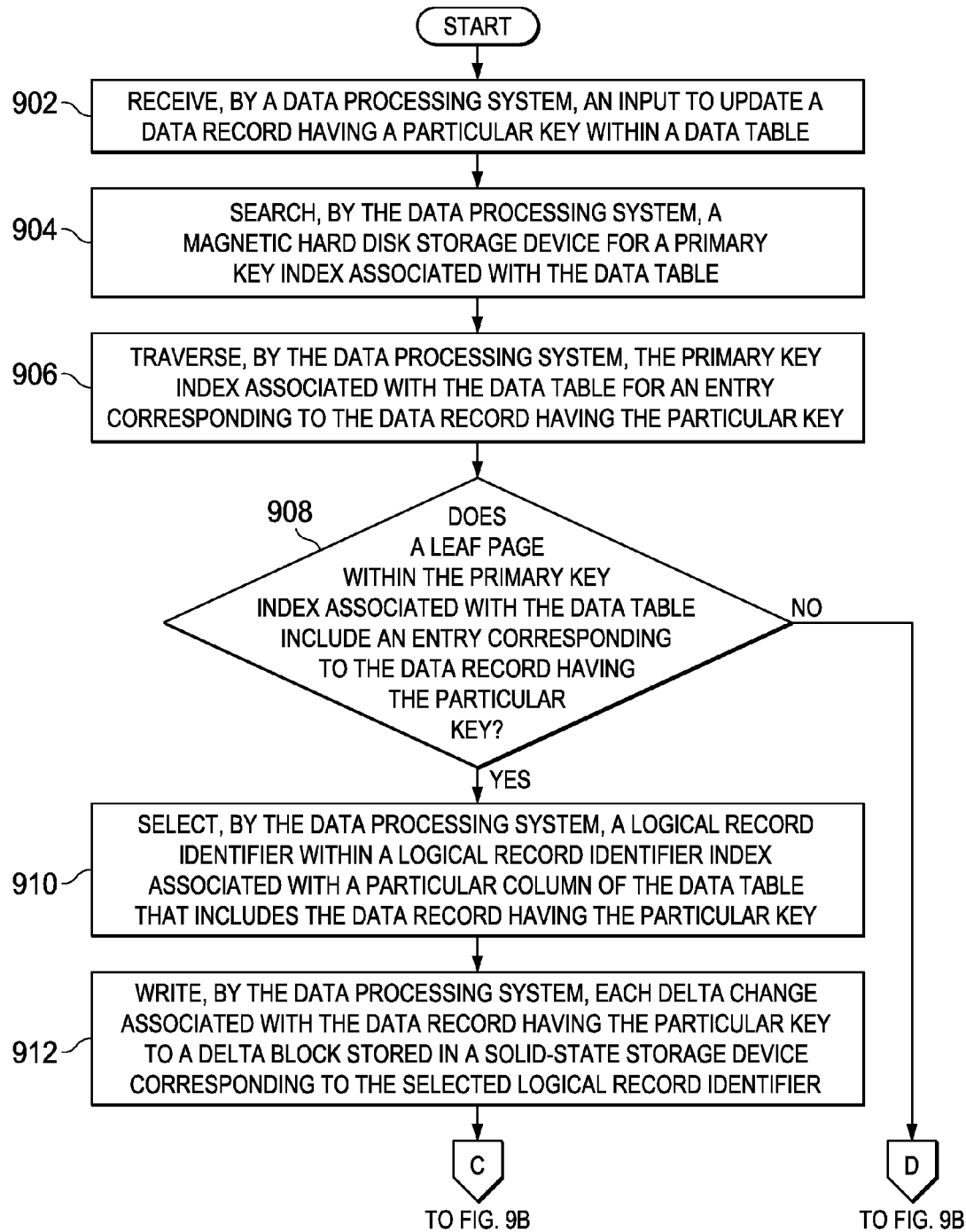
FIGS. 9A-9C are a flowchart illustrating a process for updating data records in a relational data table using a direct delta block process in accordance with an illustrative embodiment.
Figure 9B:
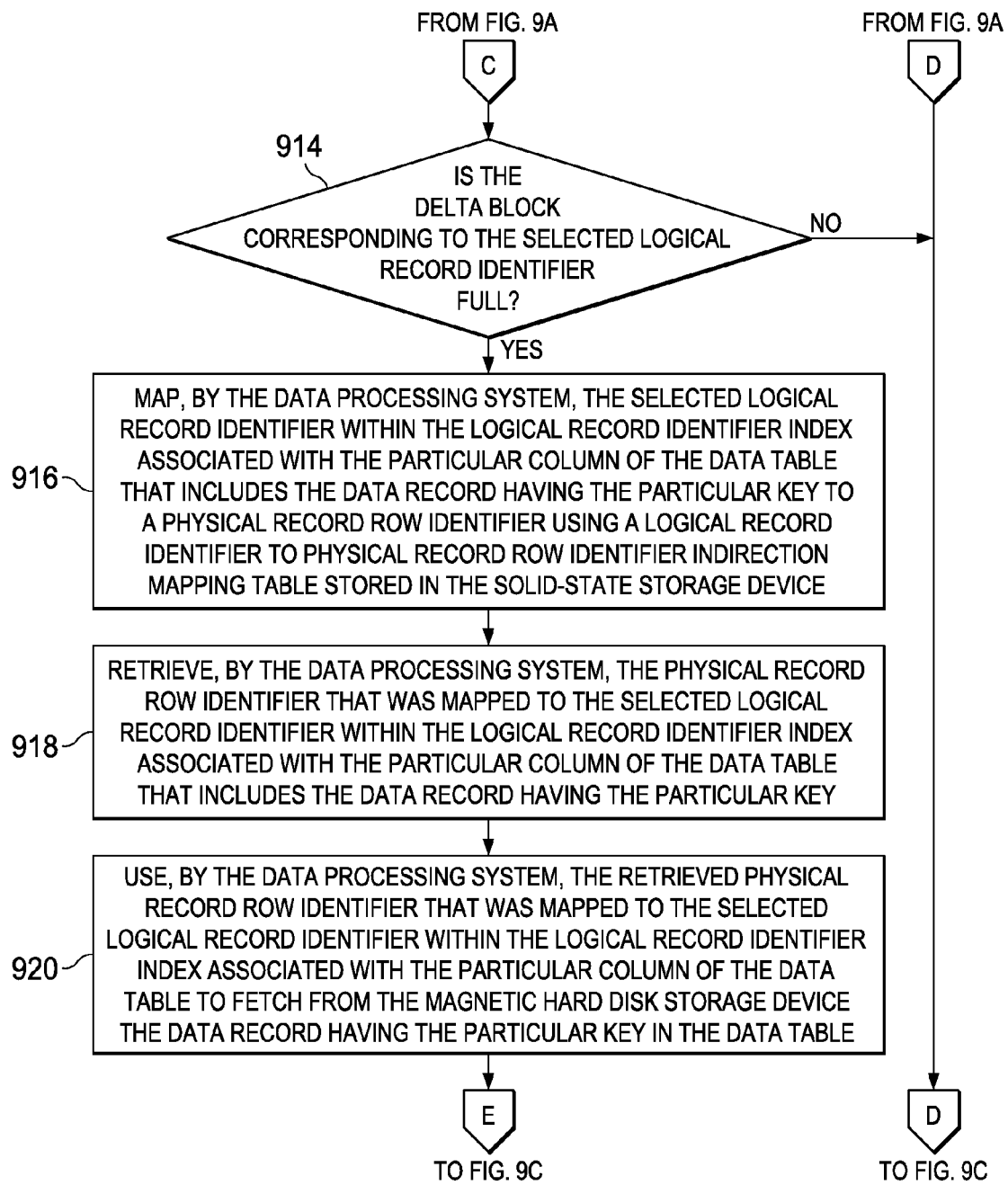
Figure 9C:
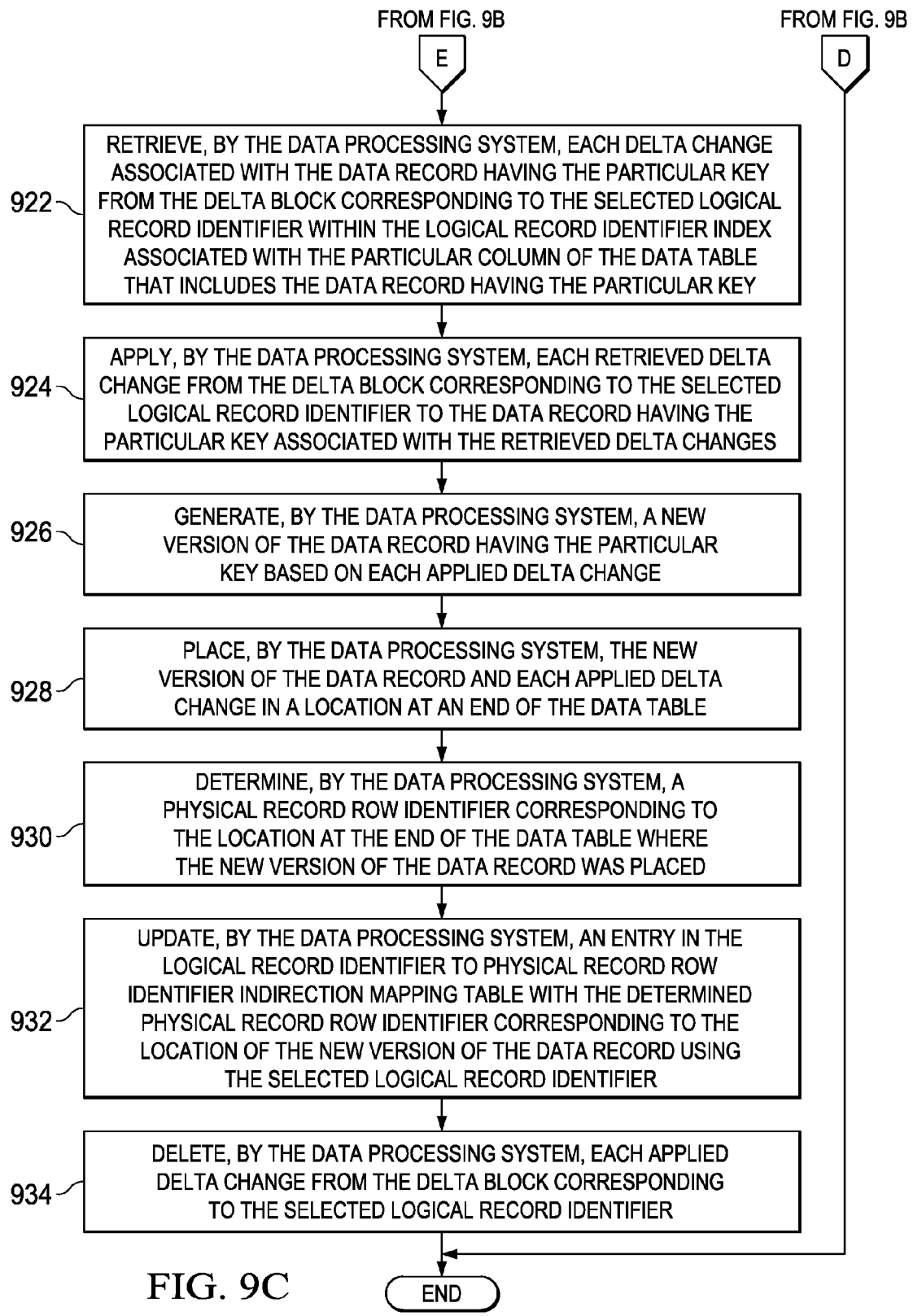

With reference now to FIGS. 9A-9C, a flowchart illustrating a process for updating data records in a relational data table using a direct delta block process is shown in accordance with an illustrative embodiment. The process shown in FIGS. 9A-9C may be implemented in a data processing system, such as, for example, data processing system 100 in FIG. 1.

The process begins when the data processing system receives an input to update a data record having a particular key within a data table (step 902). Afterward, the data processing system searches a magnetic hard disk storage device for a primary key index associated with the data table (step 904). In addition, the data processing system traverses the primary key index associated with the data table for an entry corresponding to the data record having the particular key (step 906).

Subsequently, the data processing system makes a determination as to whether a leaf page within the primary key index associated with the data table includes an entry corresponding to the data record having the particular key (step 908). If the data processing system determines that no leaf page within the primary key index associated with the data table includes an entry corresponding to the data record having the particular key, no output of step 908, then the process terminates thereafter. If the data processing system determines that a leaf page within the primary key index associated with the data table does include an entry corresponding to the data record having the particular key, yes output of step 908, then the data processing system selects a logical record identifier within a logical record identifier index associated with a particular column of the data table that includes the data record having the particular key (step 910).

Afterward, the data processing system writes each delta change associated with the data record having the particular key to a delta block stored in a solid-state storage device corresponding to the selected logical record identifier (step 912). Then, the data processing system makes a determination as to whether the delta block corresponding to the selected logical record identifier is full (step 914). If the data processing system determines that the delta block corresponding to the selected logical record identifier is not full, no output of step 914, then the process terminates thereafter. If the data processing system determines that the delta block corresponding to the selected logical record identifier is full, yes output of step 914, then the data processing system maps the selected logical record identifier within the logical record identifier index associated with the particular column of the data table that includes the data record having the particular key to a physical record row identifier using a logical record identifier to physical record row identifier indirection mapping table stored in the solid-state storage device (step 916).

Further, the data processing system retrieves the physical record row identifier that was mapped to the selected logical record identifier within the logical record identifier index associated with the particular column of the data table that includes the data record having the particular key (step 918). Furthermore, the data processing system uses the retrieved physical record row identifier that was mapped to the selected logical record identifier within the logical record identifier index associated with the particular column of the data table to fetch from the magnetic hard disk storage device the data record having the particular key in the data table (step 920). In addition, the data processing system retrieves each delta change associated with the data record having the particular key from the delta block corresponding to the selected logical record identifier within the logical record identifier index associated with the particular column of the data table that includes the data record having the particular key (step 922).

Afterward, the data processing system applies each retrieved delta change from the delta block corresponding to the selected logical record identifier to the data record having the particular key associated with the retrieved delta changes (step 924). Then, the data processing system generates a new version of the data record having the particular key based on each applied delta change (step 926). The data processing system also places the new version of the data record and each applied delta change in a location at an end of the data table (step 928).

In addition, the data processing system determines a physical record row identifier corresponding to the location at the end of the data table where the new version of the data record was placed (step 930). Further, the data processing system updates an entry in the logical record identifier to physical record row identifier indirection mapping table with the determined physical record row identifier corresponding to the location of the new version of the data record using the selected logical record identifier (step 932). The data processing system also deletes each applied delta change from the delta block corresponding to the selected logical record identifier (step 934).

Figure 10A:
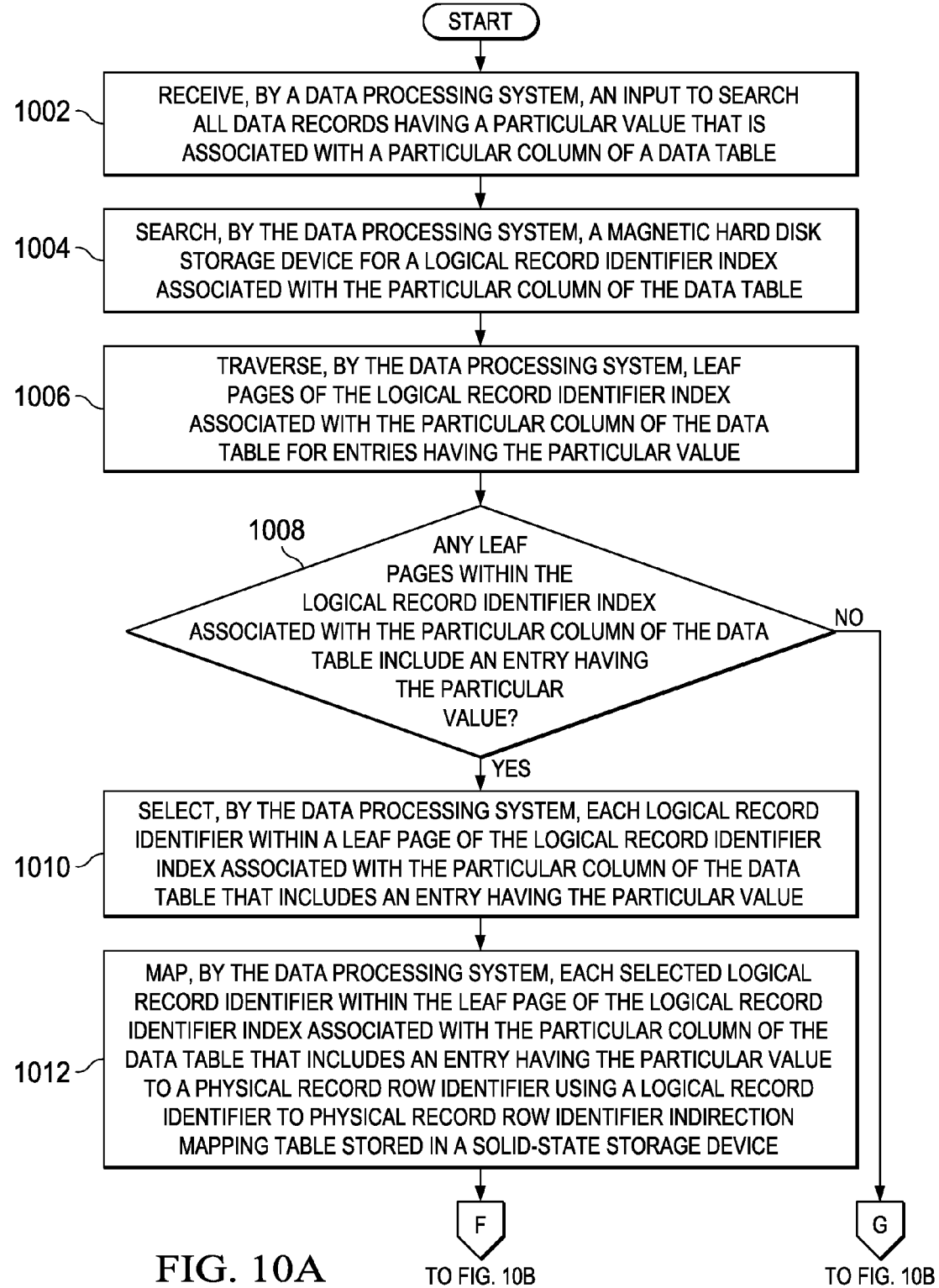
FIGS. 10A-10B are a flowchart illustrating a process for searching data records in a relational data table using an indirect delta block process in accordance with an illustrative embodiment.
Figure 10B:
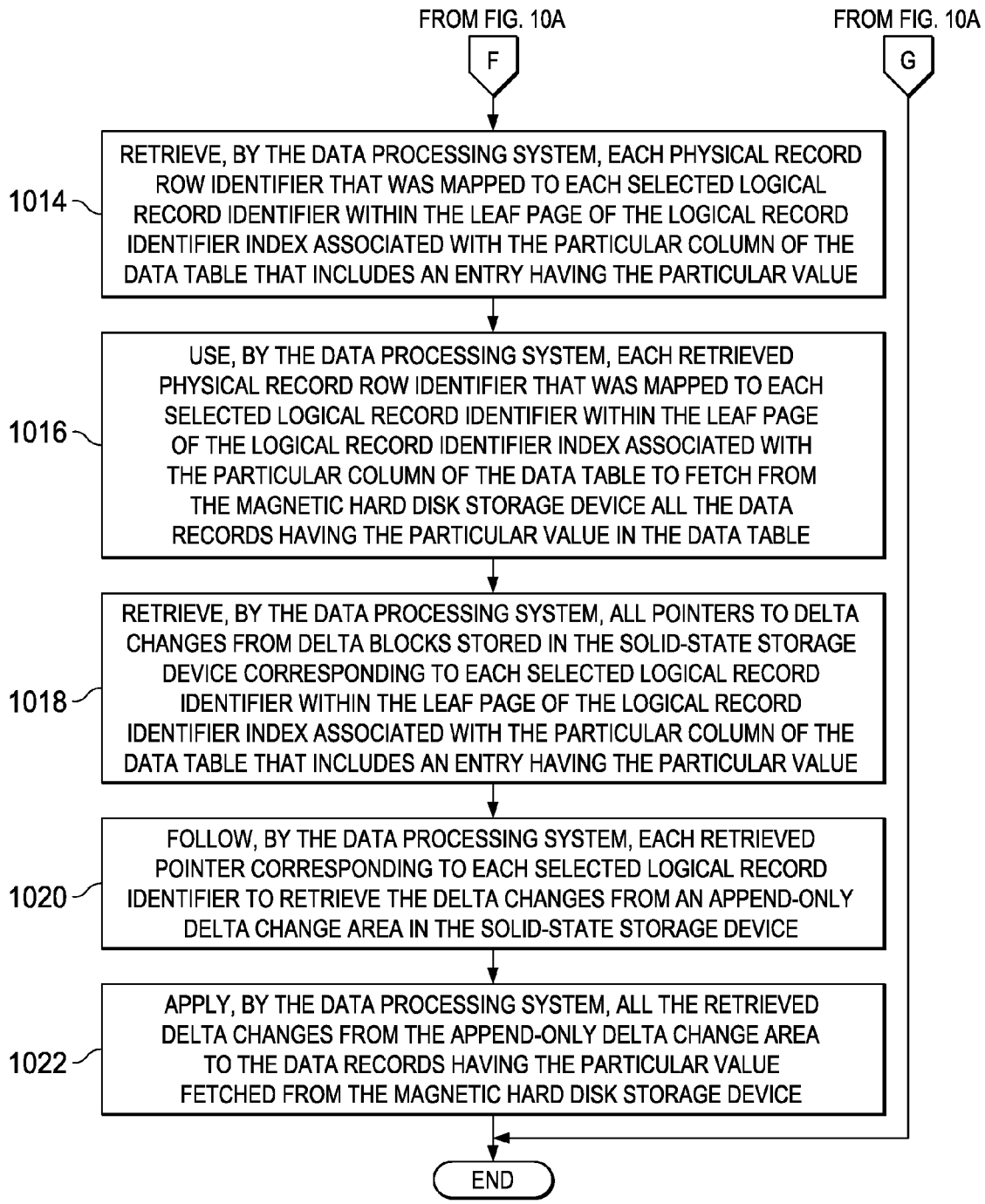

With reference now to FIGS. 10A-10B, a flowchart illustrating a process for searching data records in a relational data table using an indirect delta block process is shown in accordance with an illustrative embodiment. The process shown in FIGS. 10A-10B may be implemented in a data processing system, such as, for example, data processing system 100 in FIG. 1.

The process begins when the data processing system receives an input to search all data records having a particular value that is associated with a particular column of a data table (step 1002). Afterward, the data processing system searches a magnetic hard disk storage device for a logical record identifier index associated with the particular column of the data table (step 1004). In addition, the data processing system traverses leaf pages of the logical record identifier index associated with the particular column of the data table for entries having the particular value (step 1006).

Subsequently, the data processing system makes a determination as to whether any leaf pages within the logical record identifier index associated with the particular column of the data table include an entry having the particular value (step 1008). If the data processing system determines that no leaf pages within the logical record identifier index associated with the particular column of the data table include an entry having the particular value, no output of step 1008, then the process terminates thereafter. If the data processing system determines that a leaf page within the logical record identifier index associated with the particular column of the data table does include an entry having the particular value, yes output of step 1008, then the data processing system selects each logical record identifier within a leaf page of the logical record identifier index associated with the particular column of the data table that includes an entry having the particular value (step 1010).

Afterward, the data processing system maps each selected logical record identifier within the leaf page of the logical record identifier index associated with the particular column of the data table that includes an entry having the particular value to a physical record row identifier using a logical record identifier to physical record row identifier indirection mapping table stored in a solid-state storage device (step 1012). In addition, the data processing system retrieves each physical record row identifier that was mapped to each selected logical record identifier within the leaf page of the logical record identifier index associated with the particular column of the data table that includes an entry having the particular value (step 1014). Further, the data processing system uses each retrieved physical record row identifier that was mapped to each selected logical record identifier within the leaf page of the logical record identifier index associated with the particular column of the data table to fetch from the magnetic hard disk storage device all the data records having the particular value in the data table (step 1016).

The data processing system also retrieves all pointers to delta changes from delta blocks stored in the solid-state storage device corresponding to each selected logical record identifier within the leaf page of the logical record identifier index associated with the particular column of the data table that includes an entry having the particular value (step 1018). Then, the data processing system follows each retrieved pointer corresponding to each selected logical record identifier to retrieve the delta changes from an append-only delta change area in the solid-state storage device (step 1020). Afterward, the data processing system applies all the retrieved delta changes from the append-only delta change area to the data records having the particular value fetched from the magnetic hard disk storage device (step 1022).

Figure 11A:
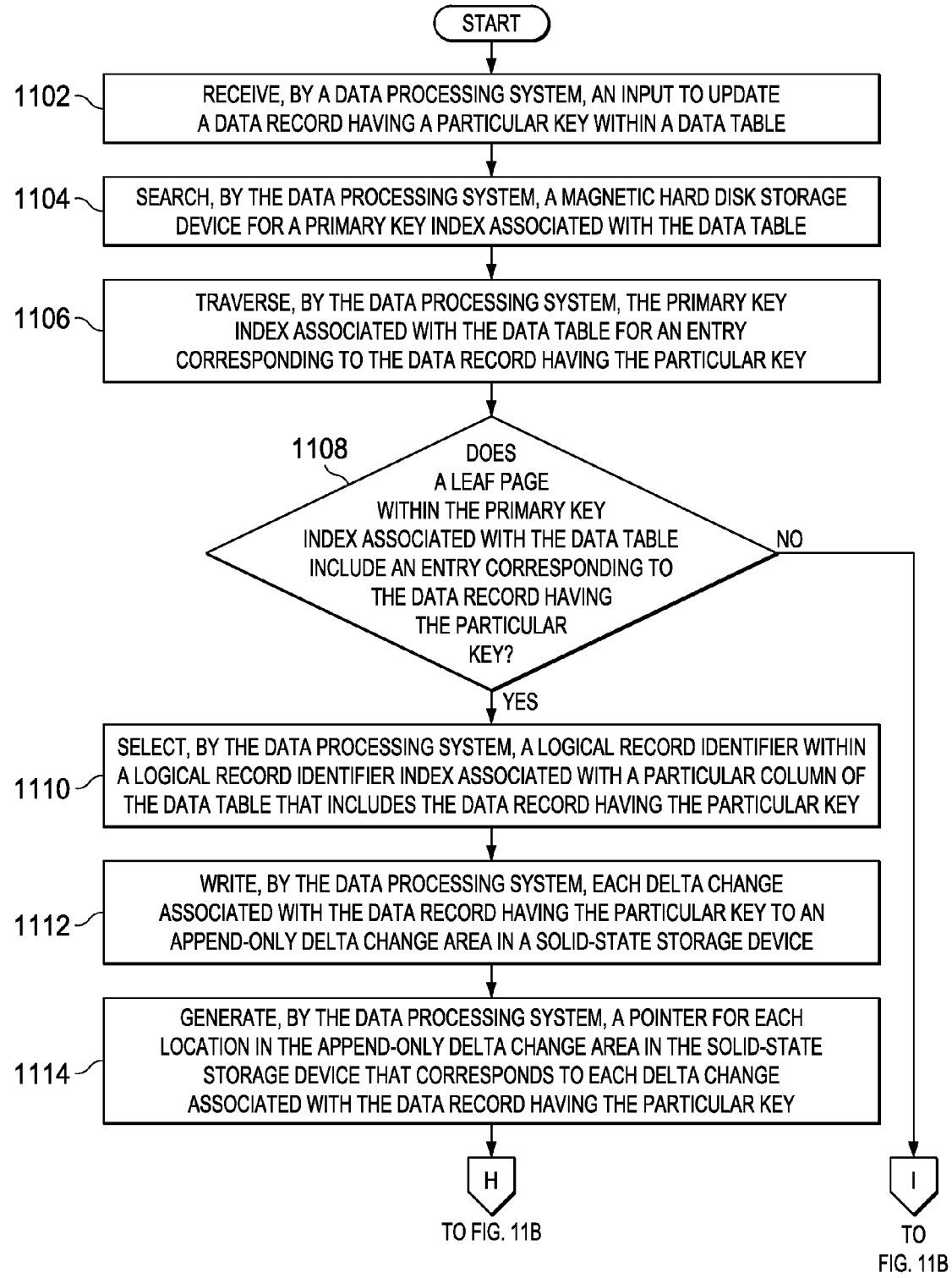
FIGS. 11A-11C are a flowchart illustrating a process for updating data records in a relational data table using an indirect delta block process in accordance with an illustrative embodiment.
Figure 11B:
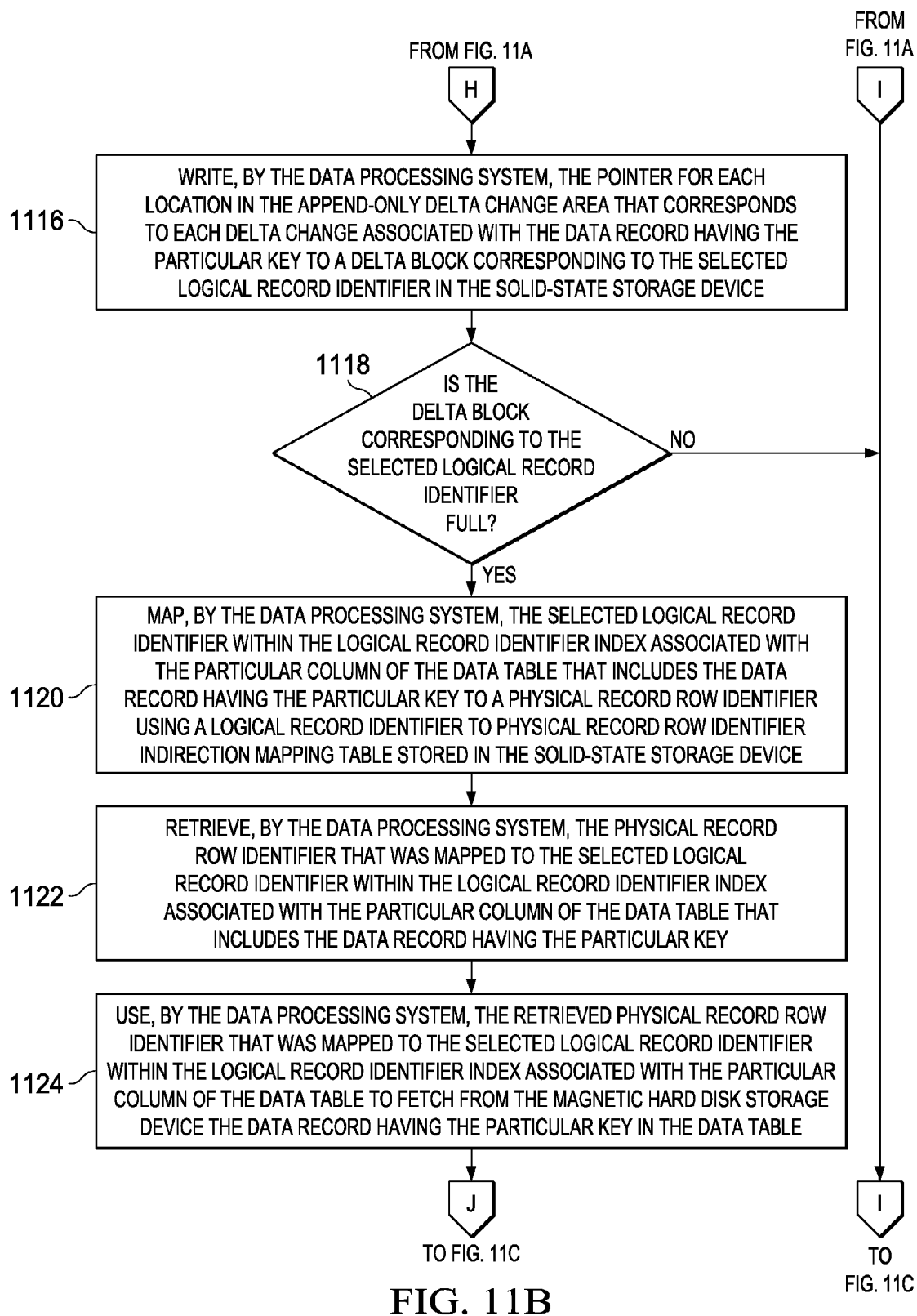
Figure 11C:
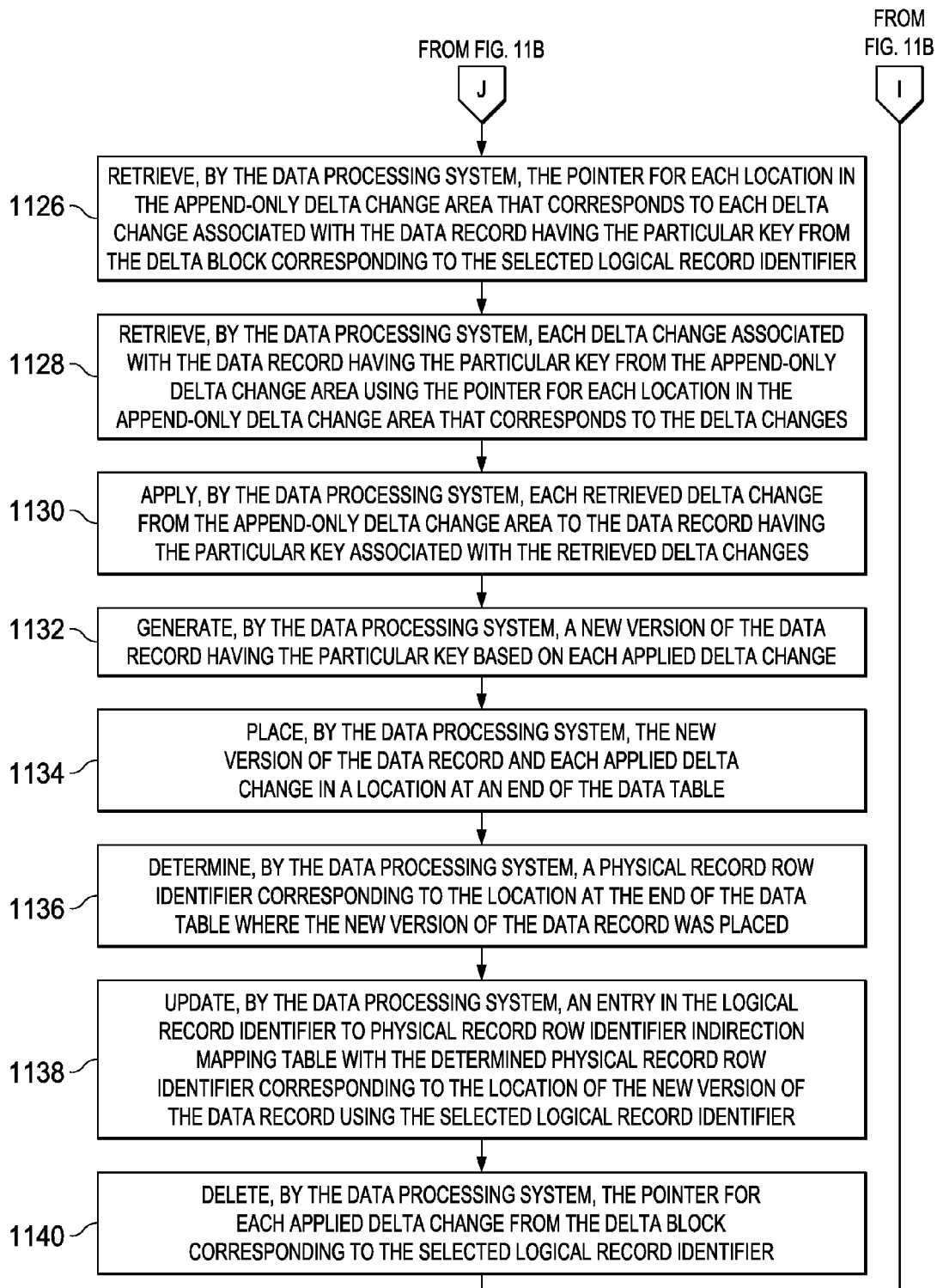

With reference now to FIGS. 11A-11C, a flowchart illustrating a process for updating data records in a relational data table using an indirect delta block process is shown in accordance with an illustrative embodiment. The process shown in FIGS. 11A-11C may be implemented in a data processing system, such as, for example, data processing system 100 in FIG. 1.

The process begins when the data processing system receives an input to update a data record having a particular key within a data table (step 1102). Afterward, the data processing system searches a magnetic hard disk storage device for a primary key index associated with the data table (step 1104). In addition, the data processing system traverses the primary key index associated with the data table for an entry corresponding to the data record having the particular key (step 1106).

Subsequently, the data processing system makes a determination as to whether a leaf page within the primary key index associated with the data table includes an entry corresponding to the data record having the particular key (step 1108). If the data processing system determines that no leaf page within the primary key index associated with the data table includes an entry corresponding to the data record having the particular key, no output of step 1108, then the process terminates thereafter. If the data processing system determines that a leaf page within the primary key index associated with the data table does include an entry corresponding to the data record having the particular key, yes output of step 1108, then the data processing system selects a logical record identifier within a logical record identifier index associated with a particular column of the data table that includes the data record having the particular key (step 1110).

In addition, the data processing system writes each delta change associated with the data record having the particular key to an append-only delta change area in a solid-state storage device (step 1112). Afterward, the data processing system generates a pointer for each location in the append-only delta change area in the solid-state storage device that corresponds to each delta change associated with the data record having the particular key (step 1114). Further, the data processing system writes the pointer for each location in the append-only delta change area that corresponds to each delta change associated with the data record having the particular key to a delta block corresponding to the selected logical record identifier in the solid-state storage device (step 1116).

Subsequently, the data processing system makes a determination as to whether the delta block corresponding to the selected logical record identifier is full (step 1118). If the data processing system determines that the delta block corresponding to the selected logical record identifier is not full, no output of step 1118, then the process terminates thereafter. If the data processing system determines that the delta block corresponding to the selected logical record identifier is full, yes output of step 1118, then the data processing system maps the selected logical record identifier within the logical record identifier index associated with the particular column of the data table that includes the data record having the particular key to a physical record row identifier using a logical record identifier to physical record row identifier indirection mapping table stored in the solid-state storage device (step 1120).

Afterward, the data processing system retrieves the physical record row identifier that was mapped to the selected logical record identifier within the logical record identifier index associated with the particular column of the data table that includes the data record having the particular key (step 1122). In addition, the data processing system uses the retrieved physical record row identifier that was mapped to the selected logical record identifier within the logical record identifier index associated with the particular column of the data table to fetch from the magnetic hard disk storage device the data record having the particular key in the data table (step 1124). Then, the data processing system retrieves the pointer for each location in the append-only delta change area that corresponds to each delta change associated with the data record having the particular key from the delta block corresponding to the selected logical record identifier (step 1126). The data processing system also retrieves each delta change associated with the data record having the particular key from the append-only delta change area using the pointer for each location in the append-only delta change area that corresponds to the delta changes (step 1128).

Subsequently, the data processing system applies each retrieved delta change from the append-only delta change area to the data record having the particular key associated with the retrieved delta changes (step 1130). Then, the data processing system generates a new version of the data record having the particular key based on each applied delta change (step 1132). In addition, the data processing system places the new version of the data record and each applied delta change in a location at an end of the data table (step 1134).

Further, the data processing system determines a physical record row identifier corresponding to the location at the end of the data table where the new version of the data record was placed (step 1136). Then, the data processing system updates an entry in the logical record identifier to physical record row identifier indirection mapping table with the determined physical record row identifier corresponding to the location of the new version of the data record using the selected logical record identifier (step 1138). In addition, the data processing system deletes the pointer for each applied delta change from the delta block corresponding to the selected logical record identifier (step 1140).

Figure 12A:
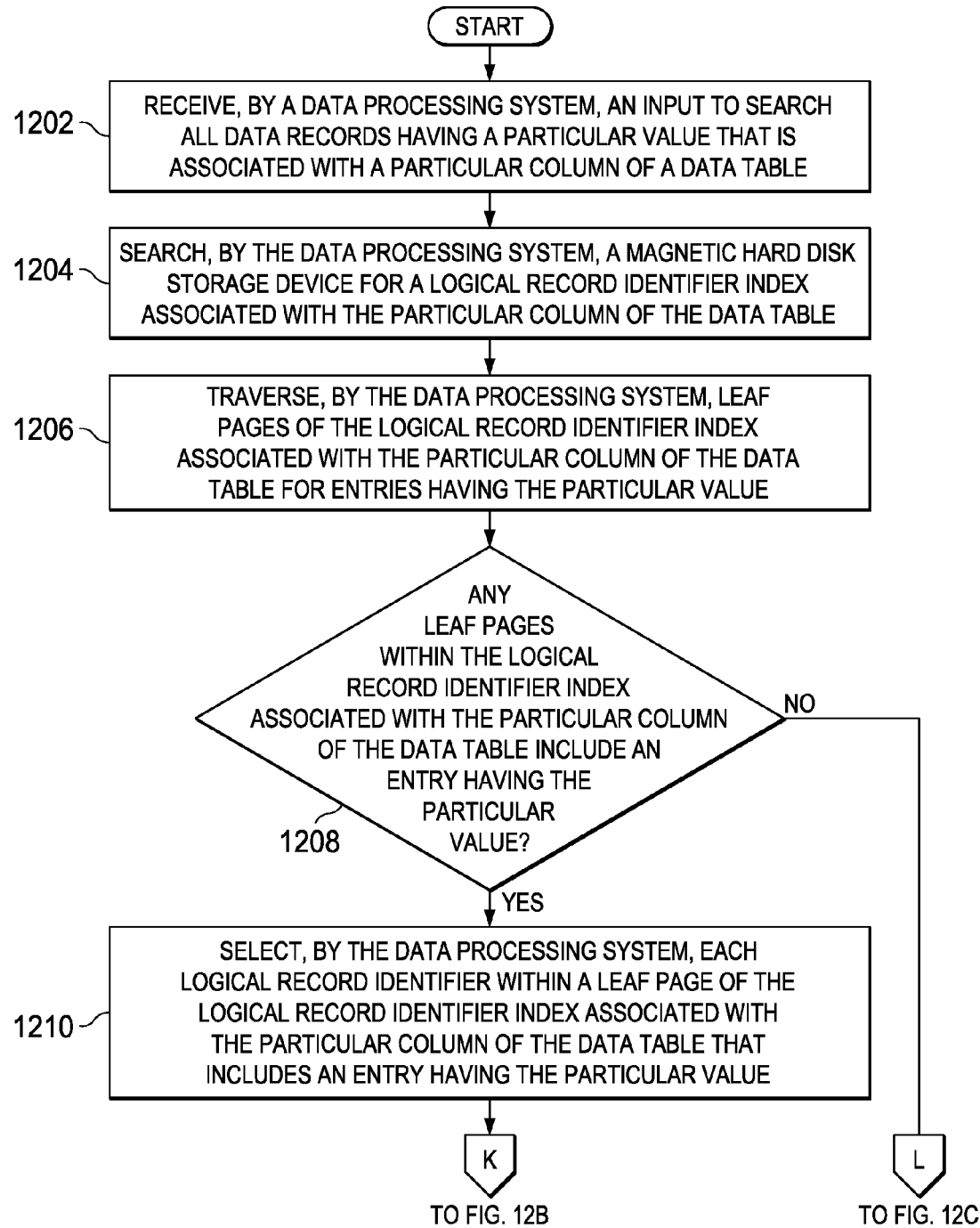
FIGS. 12A-12C are a flowchart illustrating a process for searching data records in a relational data table using an indirect delta block process with chaining in accordance with an illustrative embodiment.
Figure 12B:
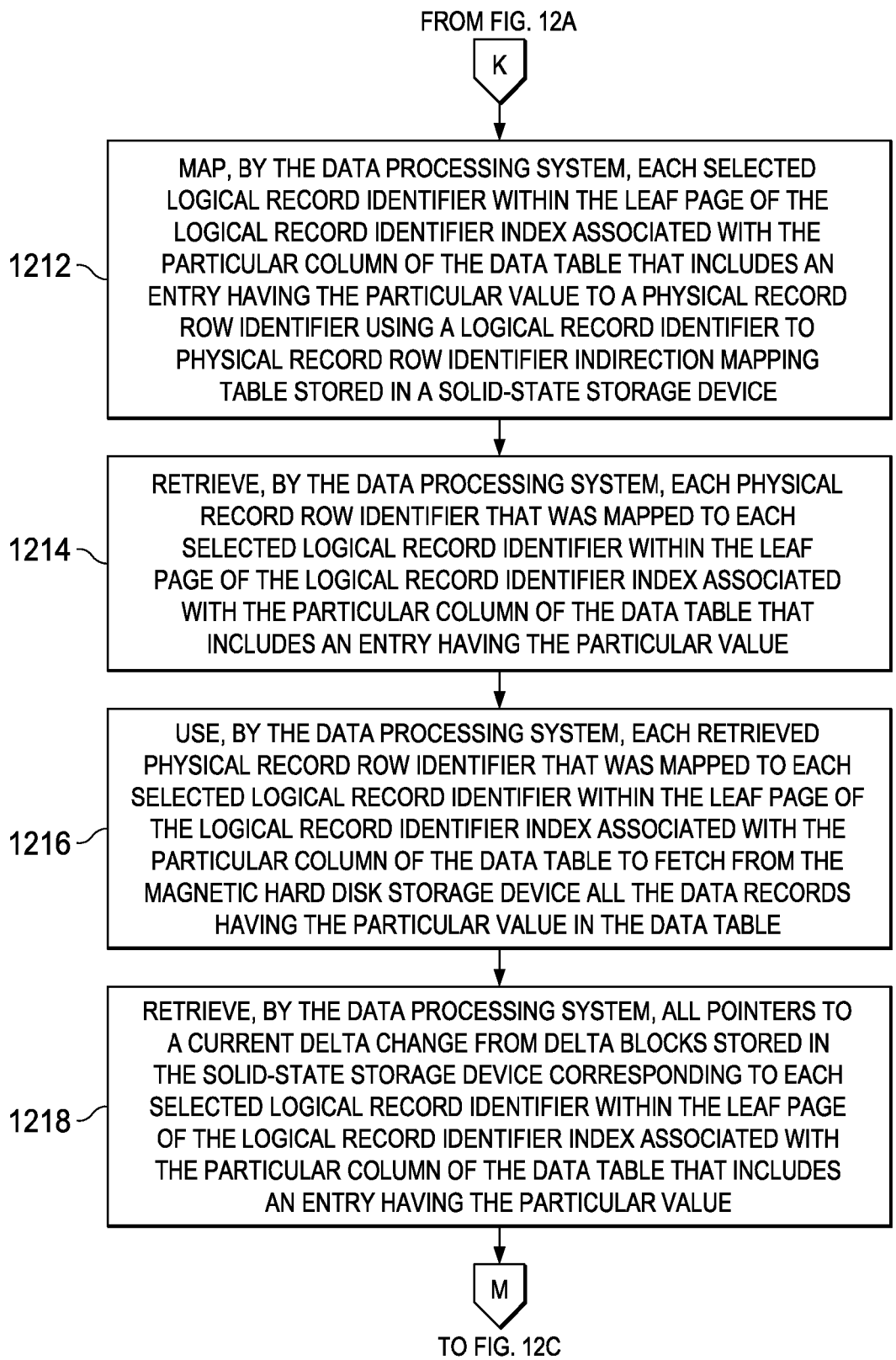
Figure 12C:
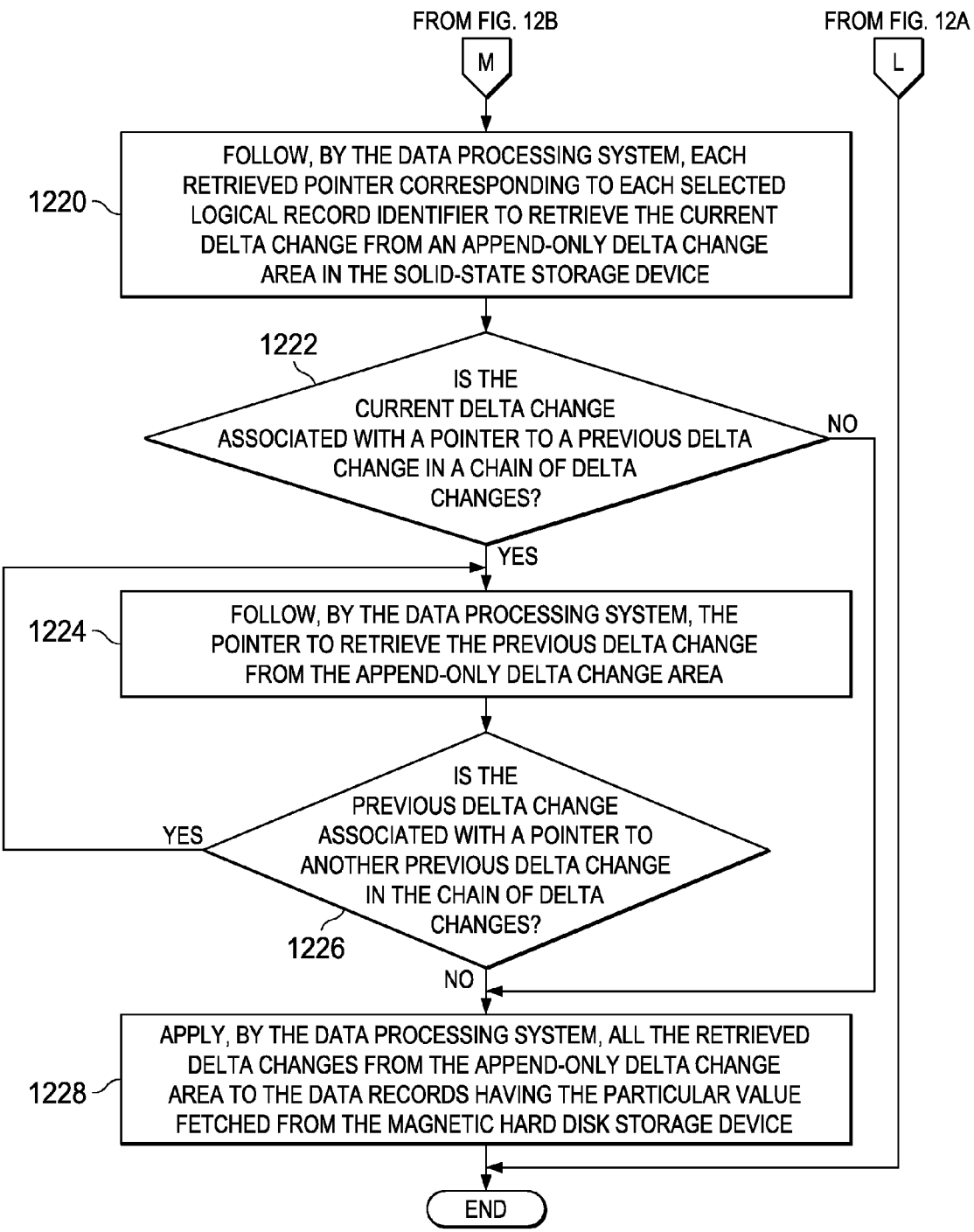
Figure 13A:
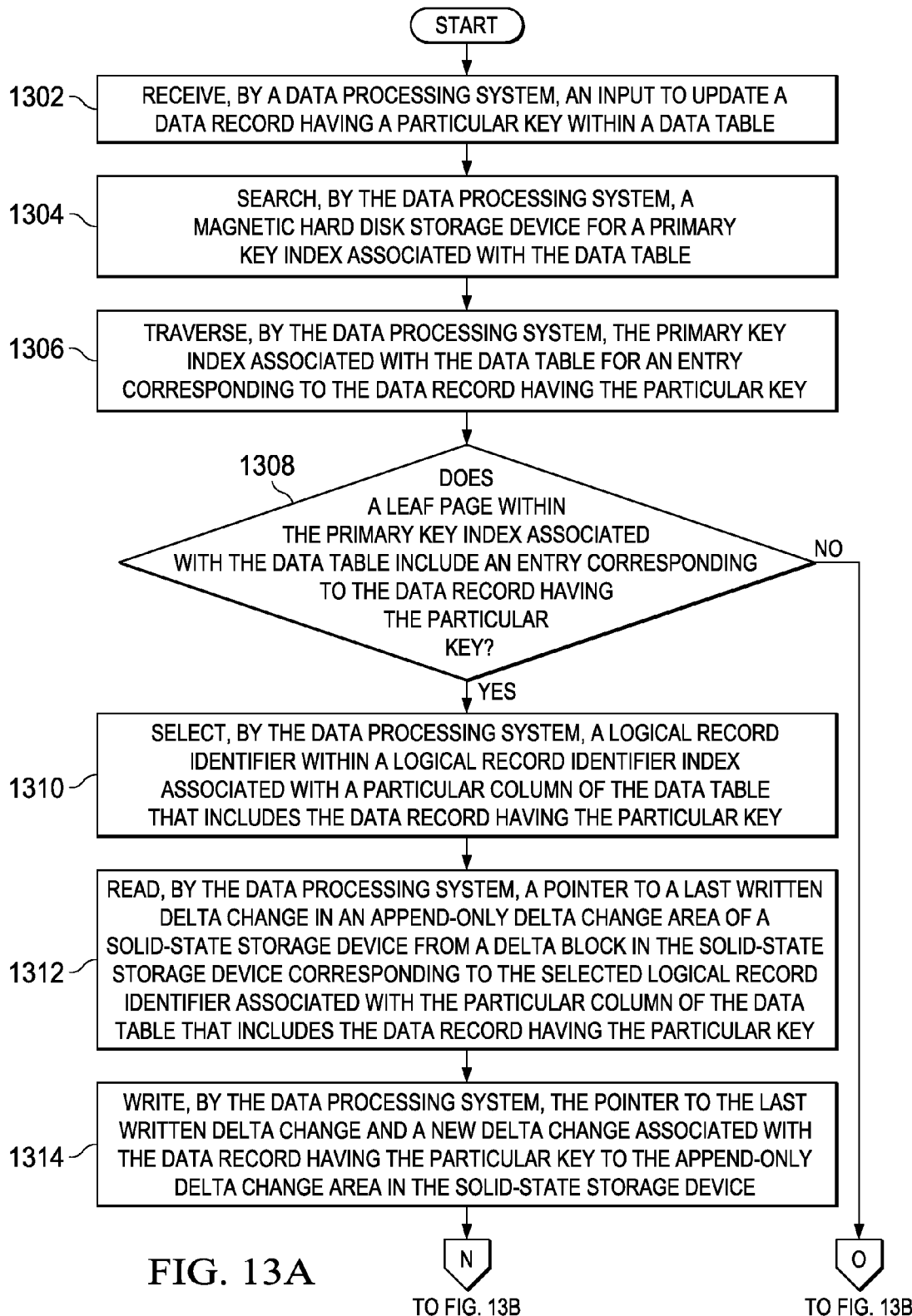
FIGS. 13A-13D are a flowchart illustrating a process for updating data records in a relational data table using an indirect delta block process with chaining in accordance with an illustrative embodiment.
Figure 13B:
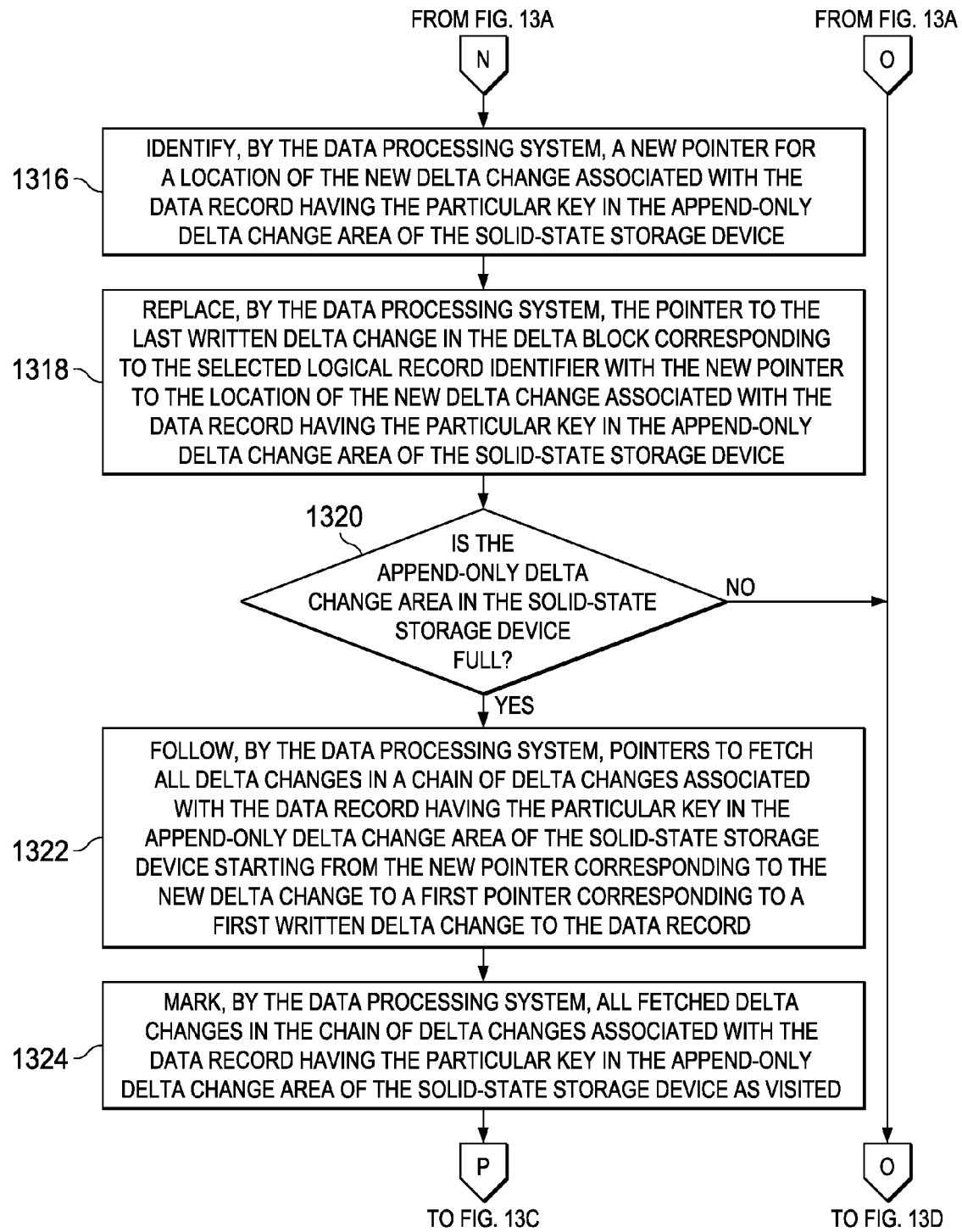
Figure 13C:
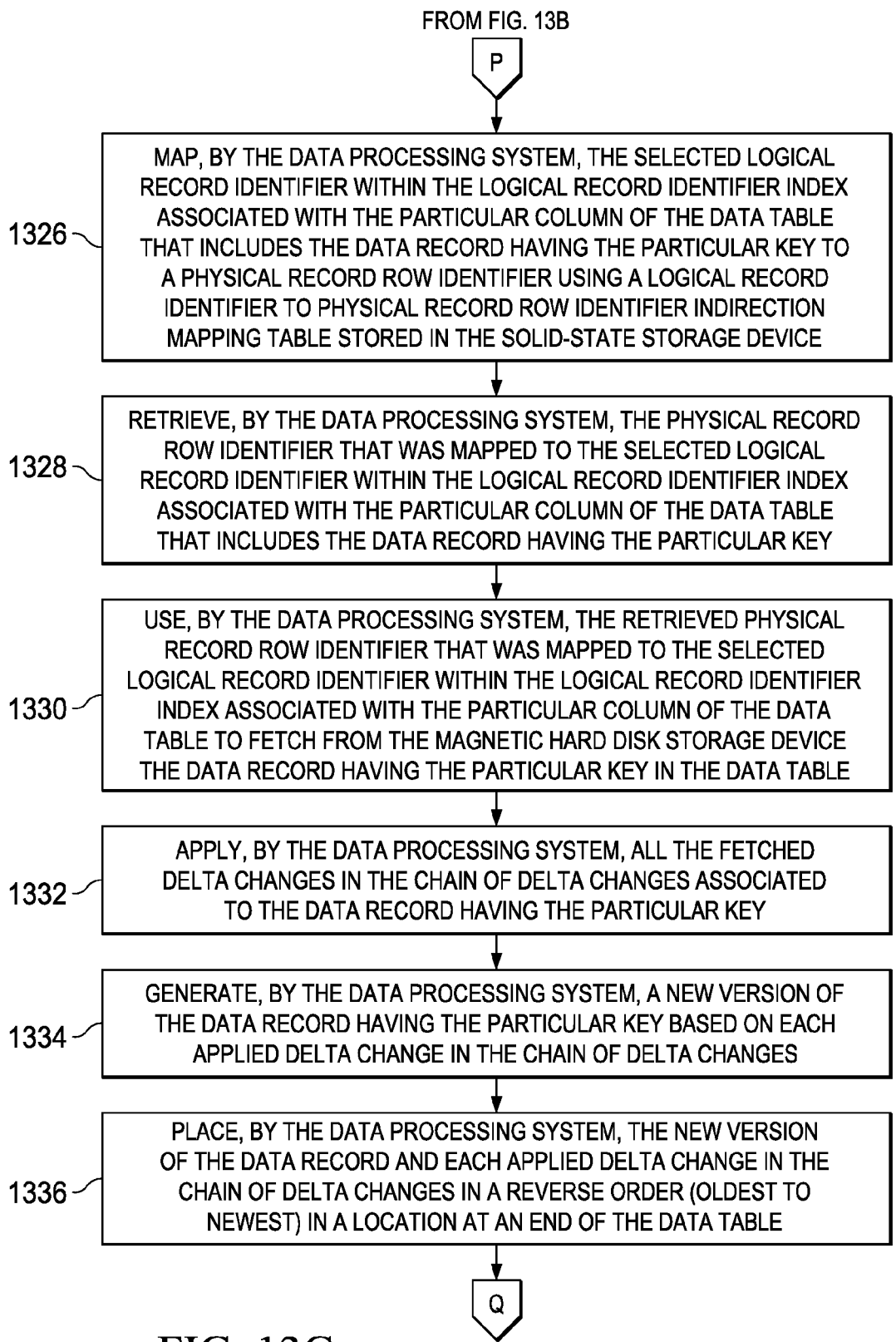
Figure 13D:
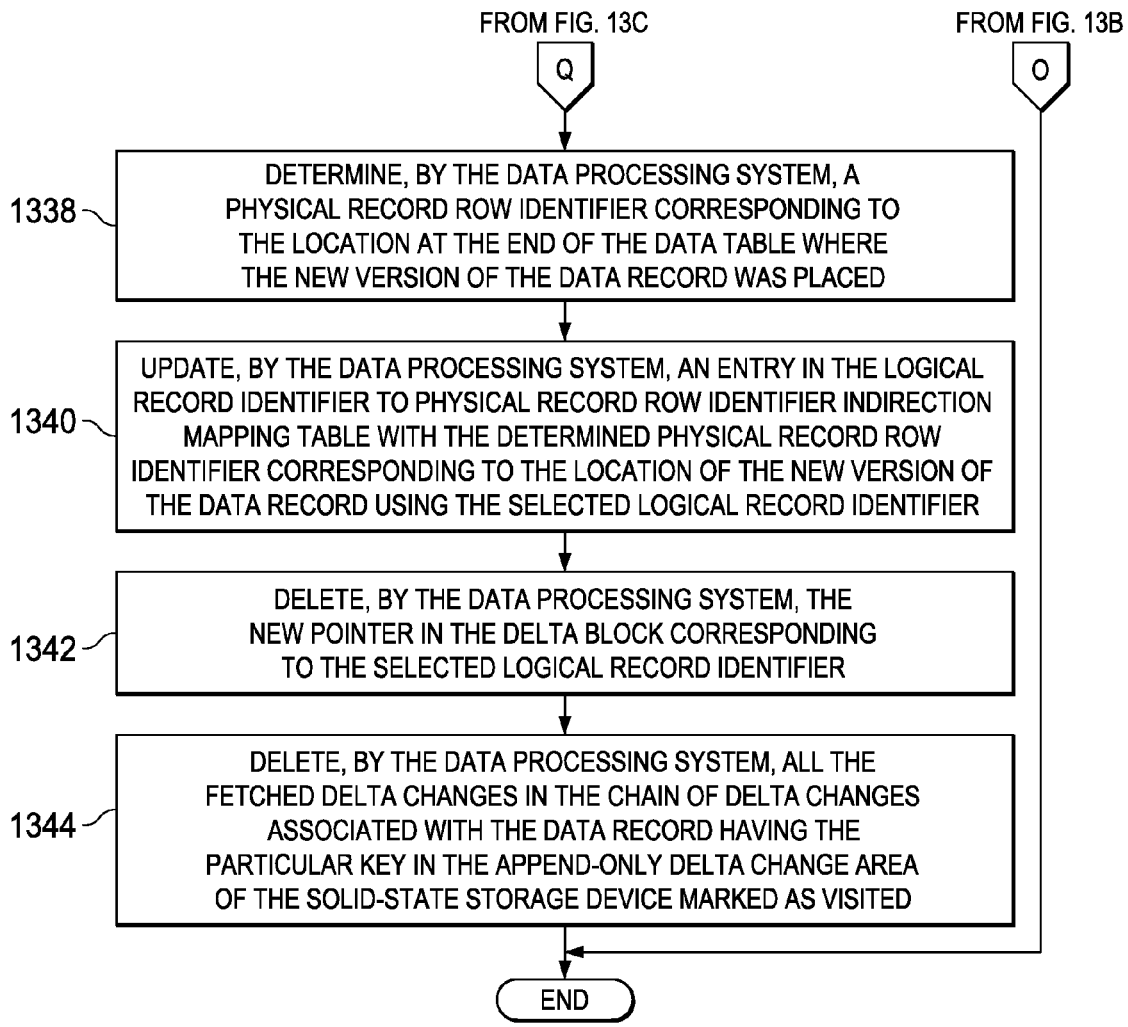

With reference now to FIGS. 12A-12C, a flowchart illustrating a process for searching data records in a relational data table using an indirect delta block process with chaining is shown in accordance with an illustrative embodiment. The process shown in FIGS. 12A-12C may be implemented in a data processing system, such as, for example, data processing system 100 in FIG. 1.

The process begins when the data processing system receives an input to search all data records having a particular value that is associated with a particular column of a data table (step 1202). Afterward, the data processing system searches a magnetic hard disk storage device for a logical record identifier index associated with the particular column of the data table (step 1204). In addition, the data processing system traverses leaf pages of the logical record identifier index associated with the particular column of the data table for entries having the particular value (step 1206).

Subsequently, the data processing system makes a determination as to whether any leaf pages within the logical record identifier index associated with the particular column of the data table include an entry having the particular value (step 1208). If the data processing system determines that no leaf pages within the logical record identifier index associated with the particular column of the data table include an entry having the particular value, no output of step 1208, then the process terminates thereafter. If the data processing system determines that a leaf page within the logical record identifier index associated with the particular column of the data table does include an entry having the particular value, yes output of step 1208, then the data processing system selects each logical record identifier within a leaf page of the logical record identifier index associated with the particular column of the data table that includes an entry having the particular value (step 1210).

Afterward, the data processing system maps each selected logical record identifier within the leaf page of the logical record identifier index associated with the particular column of the data table that includes an entry having the particular value to a physical record row identifier using a logical record identifier to physical record row identifier indirection mapping table stored in a solid-state storage device (step 1212). In addition, the data processing system retrieves each physical record row identifier that was mapped to each selected logical record identifier within the leaf page of the logical record identifier index associated with the particular column of the data table that includes an entry having the particular value (step 1214). The data processing system also uses each retrieved physical record row identifier that was mapped to each selected logical record identifier within the leaf page of the logical record identifier index associated with the particular column of the data table to fetch from the magnetic hard disk storage device all the data records having the particular value in the data table (step 1216).

Further, the data processing system retrieves all pointers to a current delta change from delta blocks stored in the solid-state storage device corresponding to each selected logical record identifier within the leaf page of the logical record identifier index associated with the particular column of the data table that includes an entry having the particular value (step 1218). Then, the data processing system follows each retrieved pointer corresponding to each selected logical record identifier to retrieve the current delta change from an append-only delta change area in the solid-state storage device (step 1220). Subsequently, the data processing system makes a determination as to whether the current delta change is associated with a pointer to a previous delta change in a chain of delta changes (step 1222).

If the data processing system determines that the current delta change is not associated with a pointer to a previous delta change in a chain of delta changes, no output of step 1222, then the process proceeds to step 1228. If the data processing system determines that the current delta change is associated with a pointer to a previous delta change in a chain of delta changes, yes output of step 1222, then the data processing system follows the pointer to retrieve the previous delta change from the append-only delta change area (step 1224). Afterward, the data processing system makes a determination as to whether the previous delta change is associated with a pointer to another previous delta change in the chain of delta changes (step 1226). If the data processing system determines that the previous delta change is associated with a pointer to another previous delta change in the chain of delta changes, yes output of step 1226, then the process returns to step 1224 where the data processing system follows the point to retrieve the next previous delta change from the append-only delta change area. If the data processing system determines that the previous delta change is not associated with a pointer to another previous delta change in the chain of delta changes, no output of step 1226, then the data processing system applies all the retrieved delta changes from the append-only delta change area to the data records having the particular value fetched from the magnetic hard disk storage device (step 1228). Thereafter, the process terminates.

With reference now to FIGS. 13A-13D, a flowchart illustrating a process for updating data records in a relational data table using an indirect delta block process with chaining is shown in accordance with an illustrative embodiment. The process shown in FIGS. 13A-13D may be implemented in a data processing system, such as, for example, data processing system 100 in FIG. 1.

The process begins when the data processing system receives an input to update a data record having a particular key within a data table (step 1302). Afterward, the data processing system searches a magnetic hard disk storage device for a primary key index associated with the data table (step 1304). In addition, the data processing system traverses the primary key index associated with the data table for an entry corresponding to the data record having the particular key (step 1306).

Subsequently, the data processing system makes a determination as to whether a leaf page within the primary key index associated with the data table includes an entry corresponding to the data record having the particular key (step 1308). If the data processing system determines that no leaf page within the primary key index associated with the data table includes an entry corresponding to the data record having the particular key, no output of step 1308, then the process terminates thereafter. If the data processing system determines that a leaf page within the primary key index associated with the data table does include an entry corresponding to the data record having the particular key, yes output of step 1308, then the data processing system selects a logical record identifier within a logical record identifier index associated with a particular column of the data table that includes the data record having the particular key (step 1310).

Afterward, the data processing system reads a pointer to a last written delta change in an append-only delta change area of a solid-state storage device from a delta block in the solid-state storage device corresponding to the selected logical record identifier associated with the particular column of the data table that includes the data record having the particular key (step 1312). In addition, the data processing system writes the pointer to the last written delta change and a new delta change associated with the data record having the particular key to the append-only delta change area in the solid-state storage device (step 1314). Further, the data processing system identifies a new pointer for a location of the new delta change associated with the data record having the particular key in the append-only delta change area of the solid-state storage device (step 1316).

Then, the data processing system replaces the pointer to the last written delta change in the delta block corresponding to the selected logical record identifier with the new pointer to the location of the new delta change associated with the data record having the particular key in the append-only delta change area of the solid-state storage device (step 1318). Subsequently, the data processing system makes a determination as to whether the append-only delta change area in the solid-state storage device is full (step 1320). If the data processing system determines that the append-only delta change area in the solid-state storage device is not full, no output of step 1320, then the process terminates thereafter. If the data processing system determines that the append-only delta change area in the solid-state storage device is full, yes output of step 1320, then the data processing system follows the pointers to fetch all delta changes in a chain of delta changes associated with the data record having the particular key in the append-only delta change area of the solid-state storage device starting from the new pointer corresponding to the new delta change to a first pointer corresponding to a first written delta change to the data record (step 1322).

Afterward, the data processing system marks all fetched delta changes in the chain of delta changes associated with the data record having the particular key in the append-only delta change area of the solid-state storage device as visited (step 1324). In addition, the data processing system maps the selected logical record identifier within the logical record identifier index associated with the particular column of the data table that includes the data record having the particular key to a physical record row identifier using a logical record identifier to physical record row identifier indirection mapping table stored in the solid-state storage device (step 1326). Further, the data processing system retrieves the physical record row identifier that was mapped to the selected logical record identifier within the logical record identifier index associated with the particular column of the data table that includes the data record having the particular key (step 1328).

The data processing system uses the retrieved physical record row identifier that was mapped to the selected logical record identifier within the logical record identifier index associated with the particular column of the data table to fetch from the magnetic hard disk storage device the data record having the particular key in the data table (step 1330). Then, the data processing system applies all the fetched delta changes in the chain of delta changes associated to the data record having the particular key (step 1332). Further, the data processing system generates a new version of the data record having the particular key based on each applied delta change in the chain of delta changes (step 1334).

The data processing system places the new version of the data record and each applied delta change in the chain of delta changes in a reverse order (oldest to newest) in a location at an end of the data table (step 1336). Afterward, the data processing system determines a physical record row identifier corresponding to the location at the end of the data table where the new version of the data record was placed (step 1338). In addition, the data processing system updates an entry in the logical record identifier to physical record row identifier indirection mapping table with the determined physical record row identifier corresponding to the location of the new version of the data record using the selected logical record identifier (step 1340).

Then, the data processing system deletes the new pointer in the delta block corresponding to the selected logical record identifier (step 1342). Further, the data processing system deletes all the fetched delta changes in the chain of delta changes associated with the data record having the particular key in the append-only delta change area of the solid-state storage device marked as visited (step 1344). Thereafter, the process terminates.

Figure 14A:
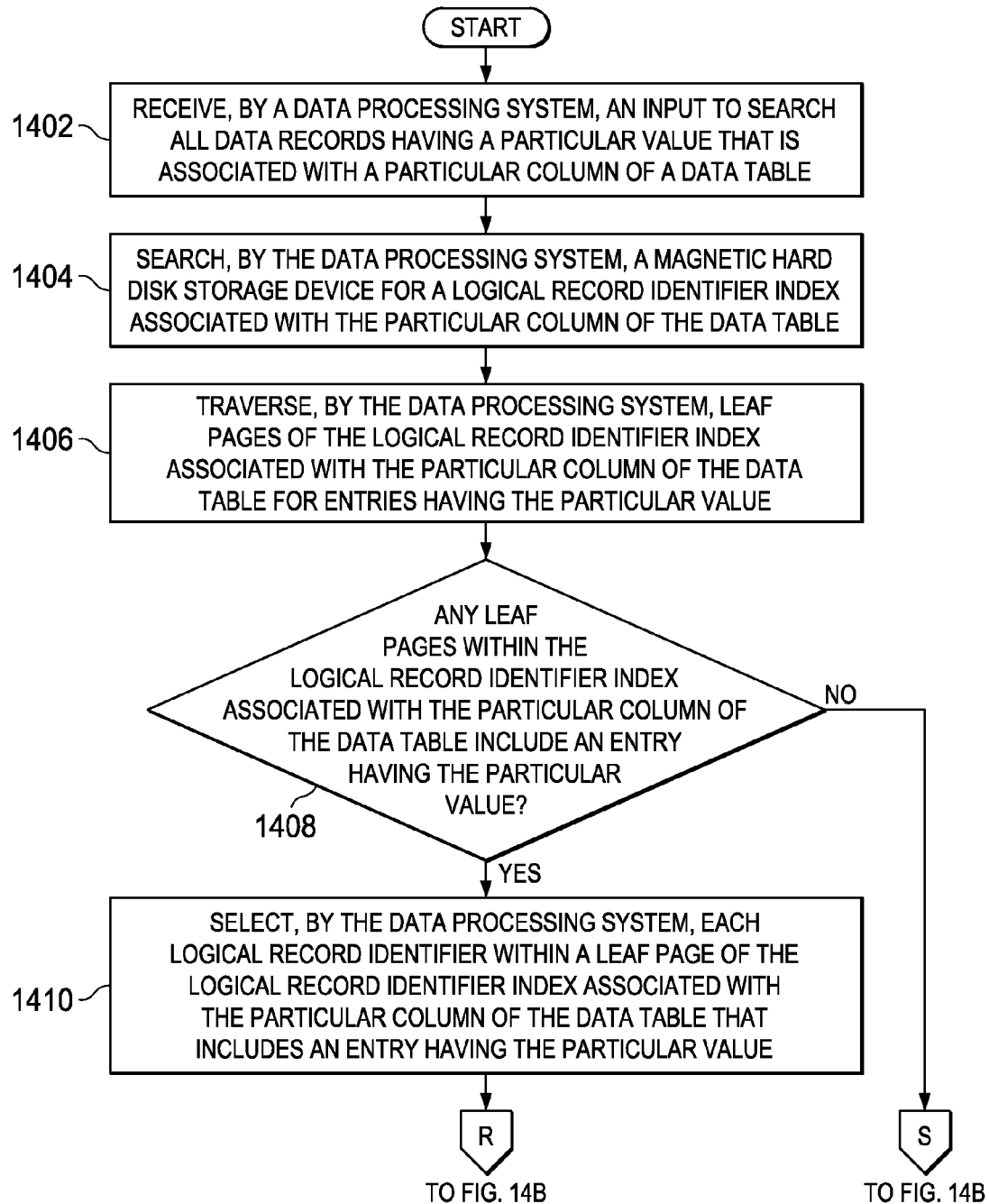
FIGS. 14A-14B are a flowchart illustrating a process for searching data records in a relational data table using an indirect delta block process with chaining and deferred compression in accordance with an illustrative embodiment.
Figure 14B:
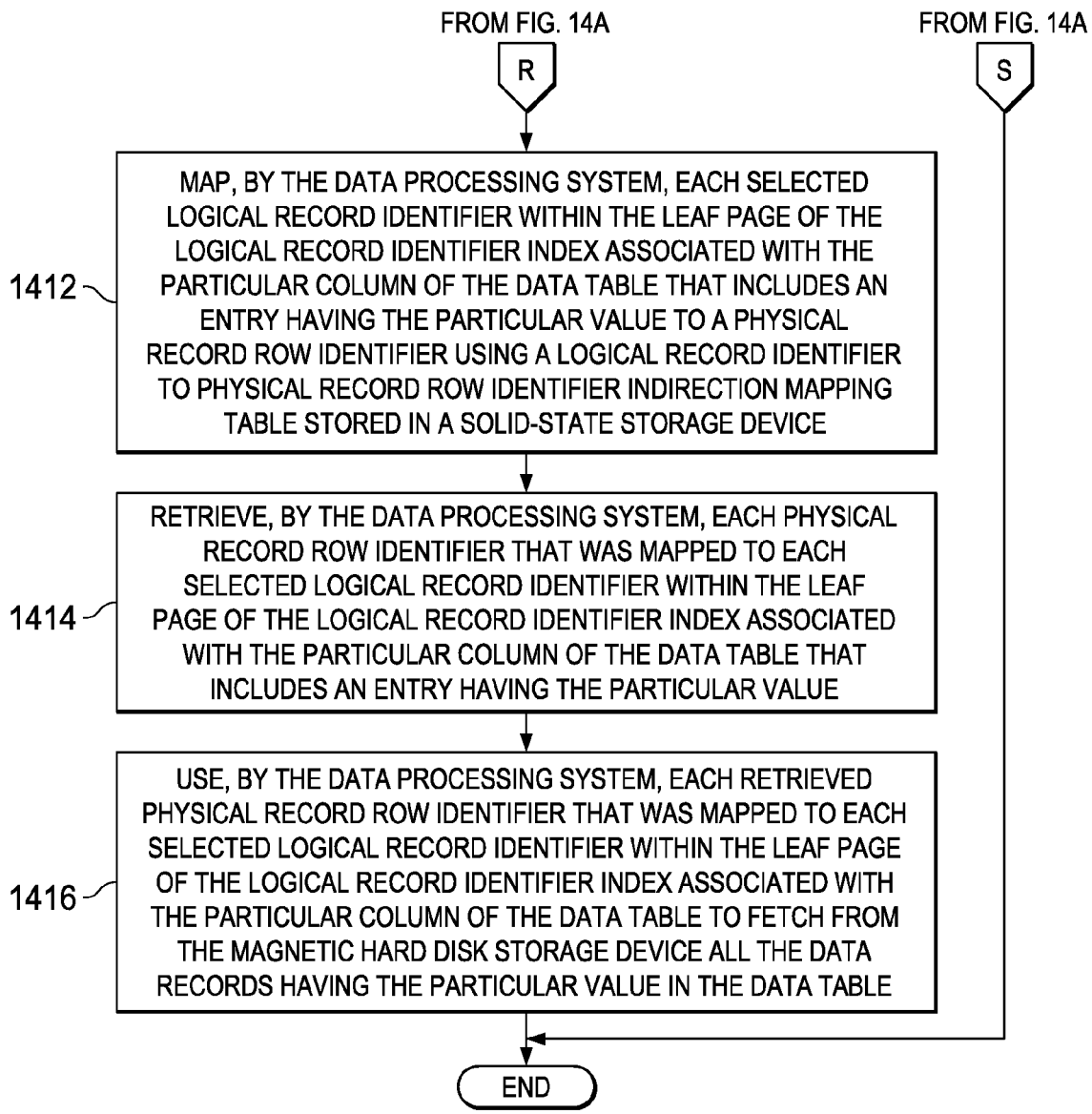
Figure 15A:
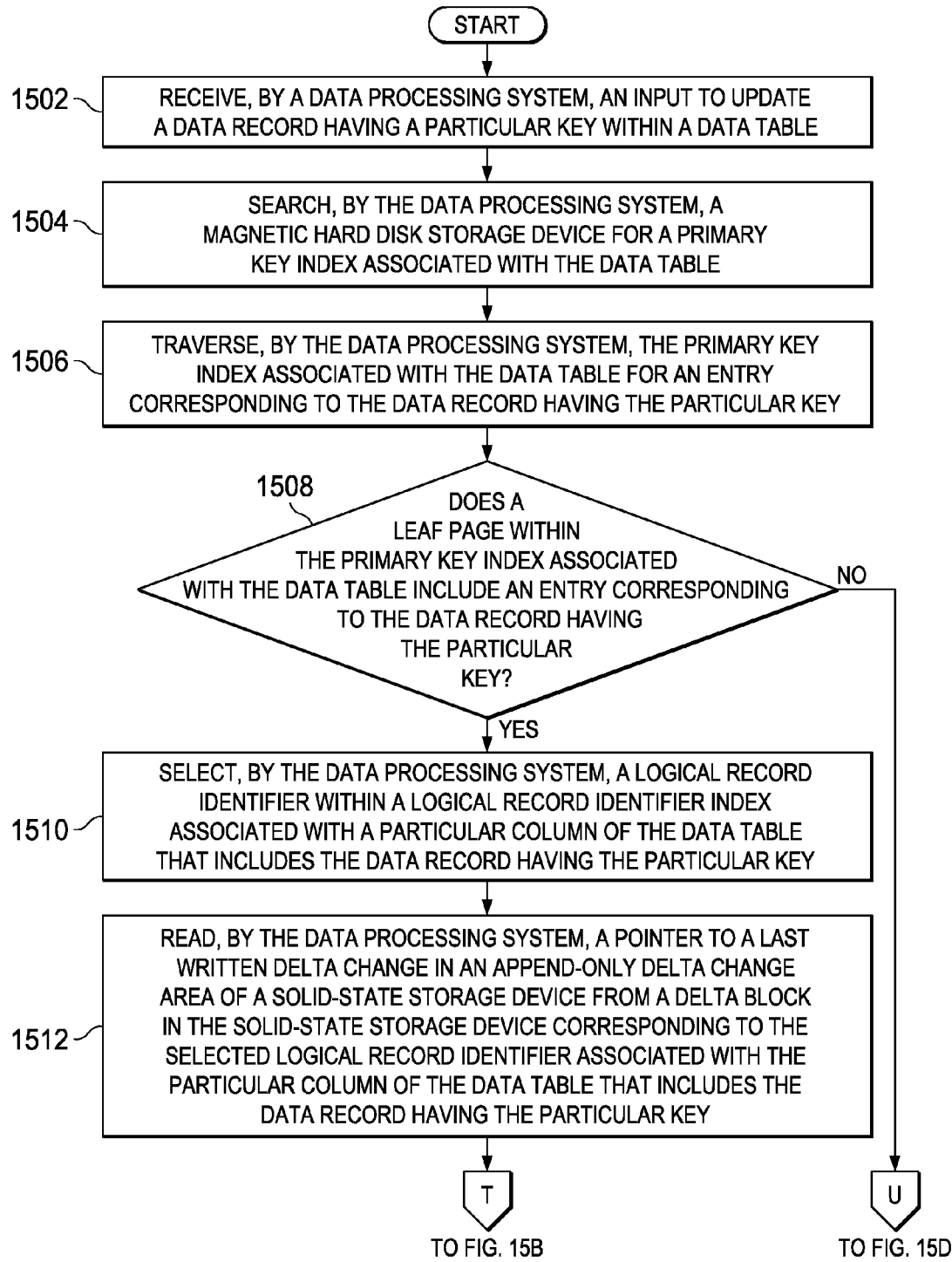
FIGS. 15A-15E are a flowchart illustrating a process for updating data records in a relational data table using an indirect delta block process with chaining and deferred compression in accordance with an illustrative embodiment.
Figure 15B:
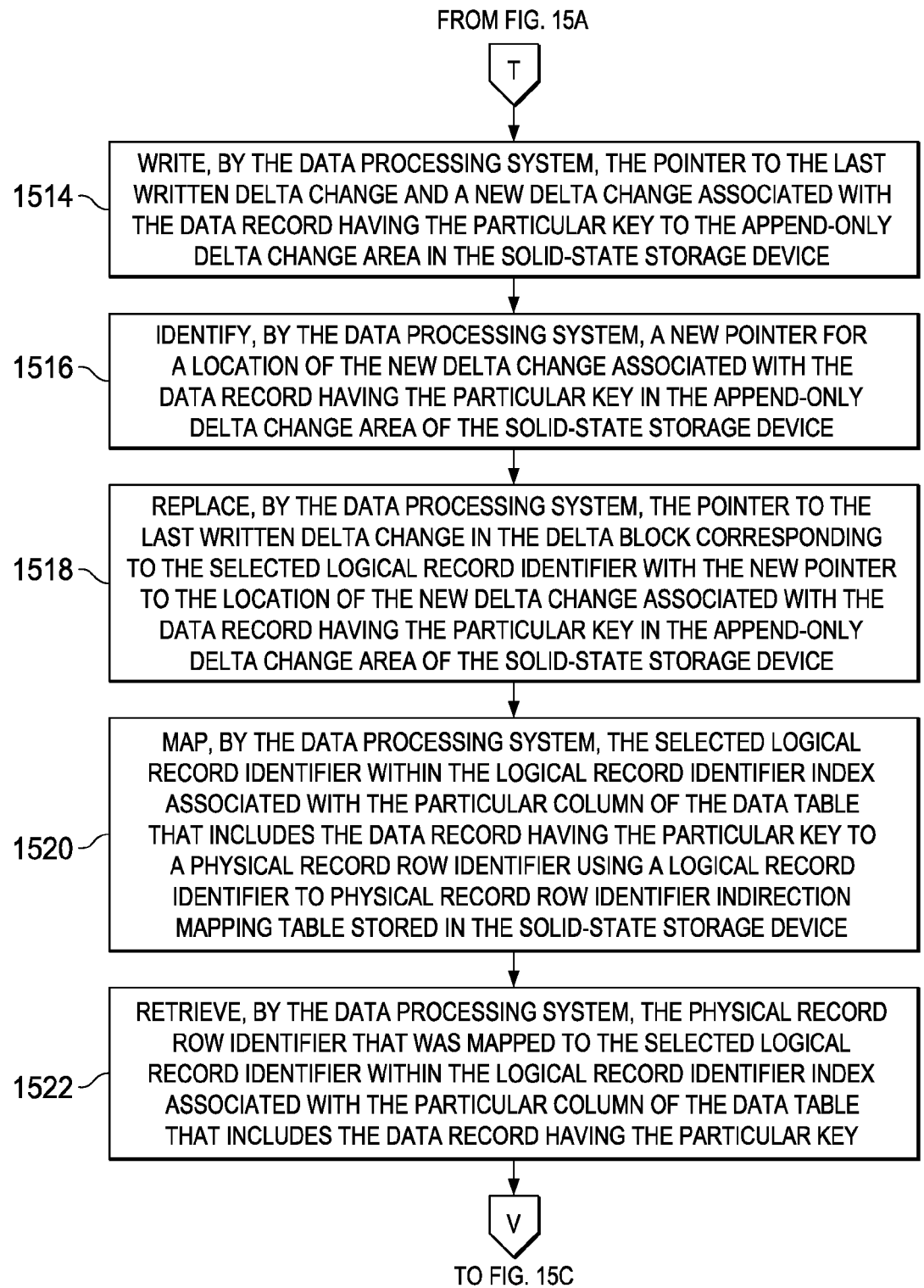
Figure 15C:
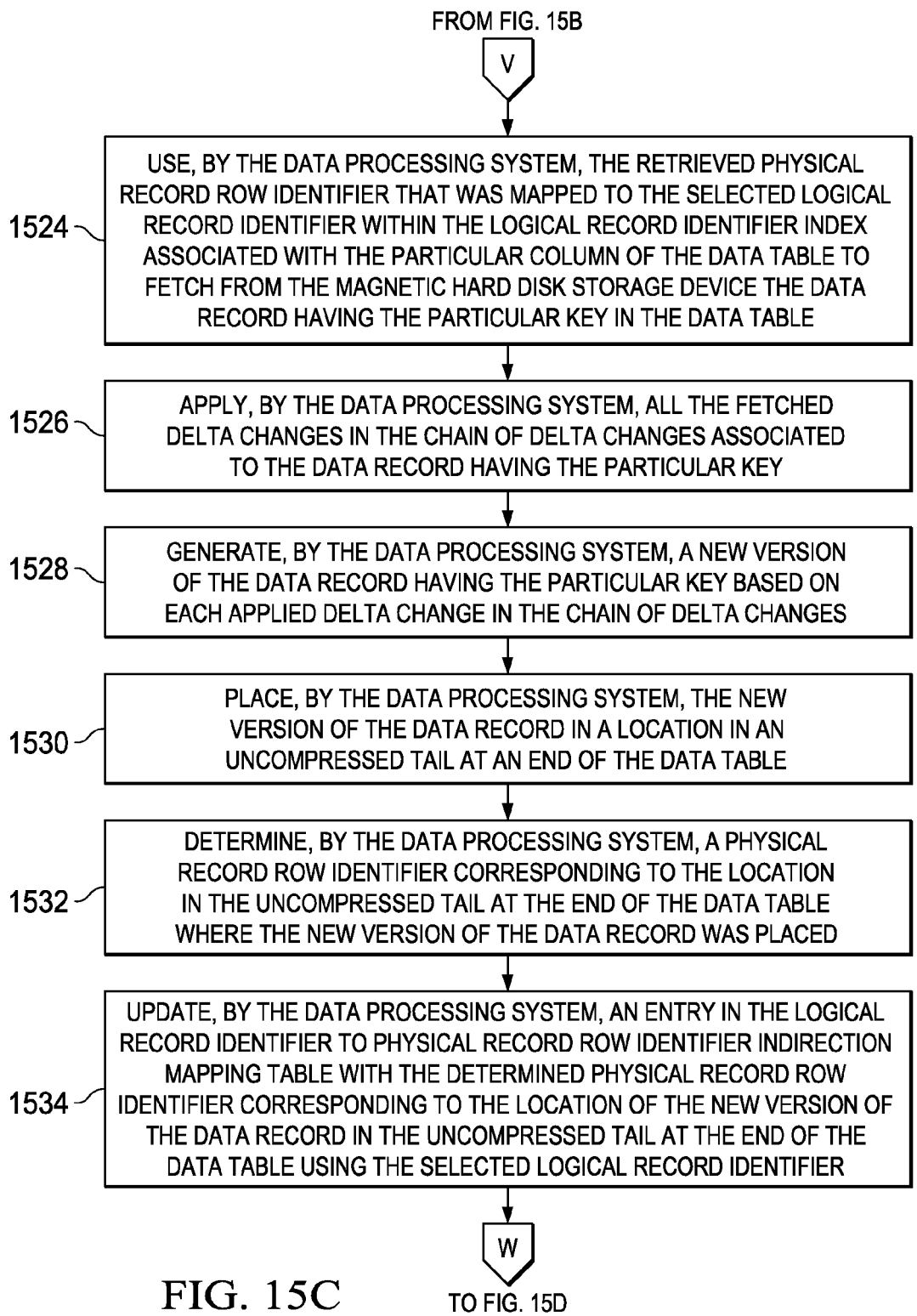
Figure 15D:
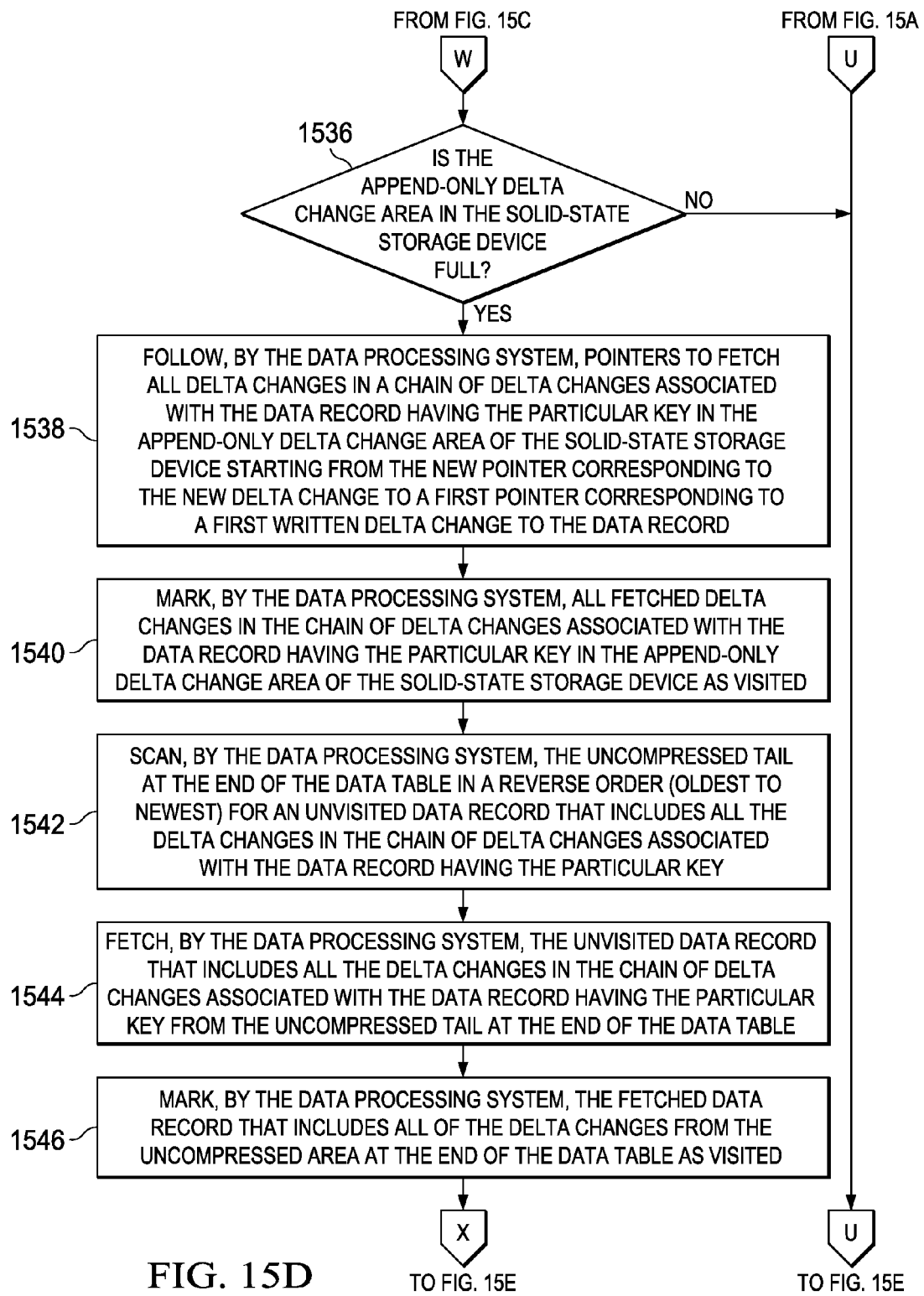
Figure 15E:
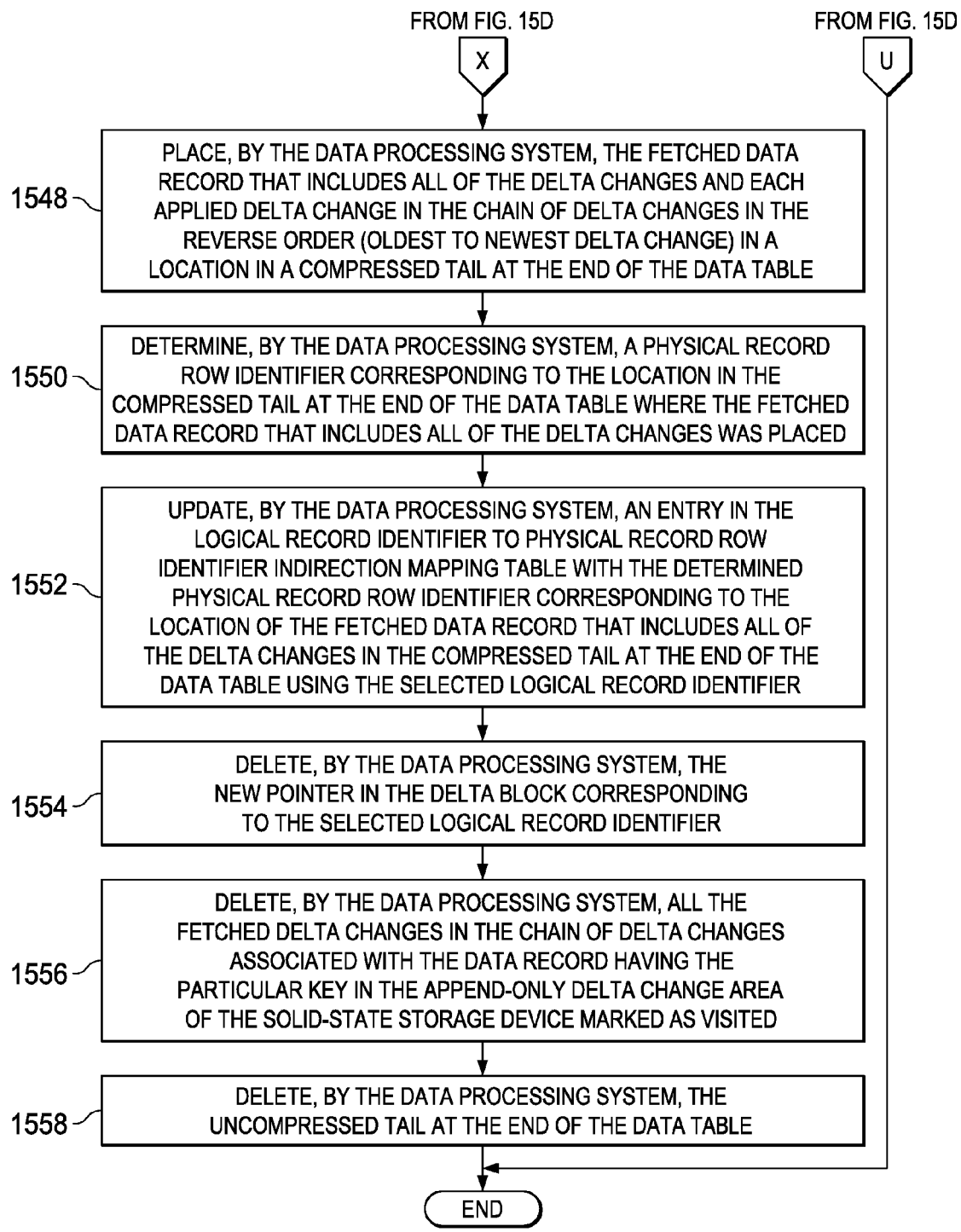

With reference now to FIGS. 14A-14B, a flowchart illustrating a process for searching data records in a relational data table using an indirect delta block process with chaining and deferred compression is shown in accordance with an illustrative embodiment. The process shown in FIGS. 14A-14B may be implemented in a data processing system, such as, for example, data processing system 100 in FIG. 1.

The process begins when the data processing system receives an input to search all data records having a particular value that is associated with a particular column of a data table (step 1402). Afterward, the data processing system searches a magnetic hard disk storage device for a logical record identifier index associated with the particular column of the data table (step 1404). In addition, the data processing system traverses leaf pages of the logical record identifier index associated with the particular column of the data table for entries having the particular value (step 1406).

Subsequently, the data processing system makes a determination as to whether any leaf pages within the logical record identifier index associated with the particular column of the data table include an entry having the particular value (step 1408). If the data processing system determines that no leaf pages within the logical record identifier index associated with the particular column of the data table include an entry having the particular value, no output of step 1408, then the process terminates thereafter. If the data processing system determines that a leaf page within the logical record identifier index associated with the particular column of the data table does include an entry having the particular value, yes output of step 1408, then the data processing system selects each logical record identifier within a leaf page of the logical record identifier index associated with the particular column of the data table that includes an entry having the particular value (step 1410).

Afterward, the data processing system retrieves each selected logical record identifier within the leaf page of the logical record identifier index associated with the particular column of the data table that includes an entry having the particular value to a physical record row identifier using a logical record identifier to physical record row identifier indirection mapping table stored in a solid-state storage device (step 1412). In addition, the data processing system retrieves each physical record row identifier that was mapped to each selected logical record identifier within the leaf page of the logical record identifier index associated with the particular column of the data table that includes an entry having the particular value (step 1414). Further, the data processing system uses each retrieved physical record row identifier that was mapped to each selected logical record identifier within the leaf page of the logical record identifier index associated with the particular column of the data table to fetch from the magnetic hard disk storage device all the data records having the particular value in the data table (step 1416). Thereafter, the process terminates.

With reference now to FIGS. 15A-15E, a flowchart illustrating a process for updating data records in a relational data table using an indirect delta block process with chaining and deferred compression is shown in accordance with an illustrative embodiment. The process shown in FIGS. 15A-15E may be implemented in a data processing system, such as, for example, data processing system 100 in FIG. 1.

The process begins when the data processing system receives an input to update a data record having a particular key within a data table (step 1502). Afterward, the data processing system searches a magnetic hard disk storage device for a primary key index associated with the data table (step 1504). In addition, the data processing system traverses the primary key index associated with the data table for an entry corresponding to the data record having the particular key (step 1506).

Subsequently, the data processing system makes a determination as to whether a leaf page within the primary key index associated with the data table includes an entry corresponding to the data record having the particular key (step 1508). If the data processing system determines that no leaf page within the primary key index associated with the data table includes an entry corresponding to the data record having the particular key, no output of step 1508, then the process terminates thereafter. If the data processing system determines that a leaf page within the primary key index associated with the data table does include an entry corresponding to the data record having the particular key, yes output of step 1508, then the data processing system selects a logical record identifier within a logical record identifier index associated with a particular column of the data table that includes the data record having the particular key (step 1510).

Afterward, the data processing system reads a pointer to a last written delta change in an append-only delta change area of a solid-state storage device from a delta block in the solid-state storage device corresponding to the selected logical record identifier associated with the particular column of the data table that includes the data record having the particular key (step 1512). In addition, the data processing system writes the pointer to the last written delta change and a new delta change associated with the data record having the particular key to the append-only delta change area in the solid-state storage device (step 1514). Further, the data processing system identifies a new pointer for a location of the new delta change associated with the data record having the particular key in the append-only delta change area of the solid-state storage device (step 1516).

Then, the data processing system replaces the pointer to the last written delta change in the delta block corresponding to the selected logical record identifier with the new pointer to the location of the new delta change associated with the data record having the particular key in the append-only delta change area of the solid-state storage device (step 1518). Afterward, the data processing system maps the selected logical record identifier within the logical record identifier index associated with the particular column of the data table that includes the data record having the particular key to a physical record row identifier using a logical record identifier to physical record row identifier indirection mapping table stored in the solid-state storage device (step 1520). Further, the data processing system retrieves the physical record row identifier that was mapped to the selected logical record identifier within the logical record identifier index associated with the particular column of the data table that includes the data record having the particular key (step 1522).

The data processing system uses the retrieved physical record row identifier that was mapped to the selected logical record identifier within the logical record identifier index associated with the particular column of the data table to fetch from the magnetic hard disk storage device the data record having the particular key in the data table (step 1524). Subsequently, the data processing system applies all the fetched delta changes in the chain of delta changes associated to the data record having the particular key (step 1526). In addition, the data processing system generates a new version of the data record having the particular key based on each applied delta change in the chain of delta changes (step 1528).

Afterward, the data processing system places the new version of the data record in a location in an uncompressed tail at an end of the data table (step 1530). Further, the data processing system determines a physical record row identifier corresponding to the location in the uncompressed tail at the end of the data table where the new version of the data record was placed (step 1532). In addition, the data processing system updates an entry in the logical record identifier to physical record row identifier indirection mapping table with the determined physical record row identifier corresponding to the location of the new version of the data record in the uncompressed tail at the end of the data table using the selected logical record identifier (step 1534).

Subsequently, the data processing system makes a determination as to whether the append-only delta change area in the solid-state storage device is full, no output of (step 1536). If the data processing system determines that the append-only delta change area in the solid-state storage device is not full, no output of step 1536, then the process terminates thereafter. If the data processing system determines that the append-only delta change area in the solid-state storage device is full, yes output of step 1536, then the data processing system, follows the pointers to fetch all delta changes in a chain of delta changes associated with the data record having the particular key in the append-only delta change area of the solid-state storage device starting from the new pointer corresponding to the new delta change to a first pointer corresponding to a first written delta change to the data record (step 1538).

Further, the data processing system marks all fetched delta changes in the chain of delta changes associated with the data record having the particular key in the append-only delta change area of the solid-state storage device as visited (step 1540). In addition, the data processing system scans the uncompressed tail at the end of the data table in a reverse order (oldest to newest) for an unvisited data record that includes all the delta changes in the chain of delta changes associated with the data record having the particular key (step 1542). Afterward, the data processing system fetches the unvisited data record that includes all the delta changes in the chain of delta changes associated with the data record having the particular key from the uncompressed tail at the end of the data table (step 1544). Then, the data processing system marks the fetched data record that includes all of the delta changes from the uncompressed area at the end of the data table as visited (step 1546).

The data processing system places the fetched data record that includes all of the delta changes and each applied delta change in the chain of delta changes in the reverse order (oldest to newest delta change) in a location in a compressed tail at the end of the data table (step 1548). Afterward, the data processing system determines a physical record row identifier corresponding to the location in the compressed tail at the end of the data table where the fetched data record that includes all of the delta changes was placed (step 1550). In addition, the data processing system updates an entry in the logical record identifier to physical record row identifier indirection mapping table with the determined physical record row identifier corresponding to the location of the fetched data record that includes all of the delta changes in the compressed tail at the end of the data table using the selected logical record identifier (step 1552).

Subsequently, the data processing system deletes the new pointer in the delta block corresponding to the selected logical record identifier (step 1554). In addition, the data processing system deletes all the fetched delta changes in the chain of delta changes associated with the data record having the particular key in the append-only delta change area of the solid-state storage device marked as visited (step 1556). Further, the data processing system deletes the uncompressed tail at the end of the data table (step 1558). Thereafter, the process terminates.

Thus, illustrative embodiments provide a method, computer program product, and data processing system for compressing data records within a multi-version database. The descriptions of the various illustrative embodiments have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of computer systems, computer implemented methods, and computer program products according to various illustrative embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for managing a multi-version database, the method comprising:
    extending, by the data processing system, a logical record identifier to physical record row identifier indirection mapping table on a solid-state storage device to include a plurality of delta blocks;
    maintaining, by the data processing system, a delta block within the plurality of delta blocks for each primary key in a plurality of primary keys associated with a data table on a magnetic hard disk storage device;
    storing, by the data processing system, within a particular delta block that corresponds to a particular primary key, a pointer to a current delta change associated with a data record that corresponds to the particular primary key;
    storing, by the data processing system, the current delta change and each previous delta change in a chain of delta changes associated with the data record in an append-only delta change area of the solid-state storage device, wherein the current delta change and each previous delta change in the chain of delta changes include a pointer to an immediately preceding delta change associated with the data record;
    responsive to the data processing system determining that the append-only delta change area contains a predetermined number of delta changes, scanning, by the data processing system, an uncompressed area of the data table in a reverse order for a latest reconstructed version of the data record corresponding to the particular primary key that includes all delta changes in the chain of delta changes associated with the data record in the append-only delta change area;
    compressing, by the data processing system, the uncompressed area of the data table by deleting all earlier reconstructed versions of the data record corresponding to the particular primary key from the uncompressed area except the latest reconstructed version of the data record that includes all the delta changes in the chain of delta changes associated with the data record in the append-only delta change area;
    flushing, by the data processing system, the latest reconstructed version of the data record corresponding to the particular primary key and all the delta changes in the chain of delta changes associated with the data record from the uncompressed area to a compressed area of the data table in the reverse order; and
    deleting, by the data processing system, all the delta changes in the chain of delta changes associated with the data record corresponding to the particular primary key from the append-only area of the solid-state storage device and deleting the uncompressed area of the data table on the magnetic hard disk storage device.

2. The method of claim 1, further comprising:
storing, by the data processing system, within a particular delta block that corresponds to a particular primary key, delta changes to a data record that corresponds to the particular primary key.

3. The method of claim 2, further comprising:
responsive to the data processing system determining that the particular delta block that corresponds to the particular primary key contains a predetermined number of delta changes to the data record, flushing, by the data processing system, the predetermined number of delta changes associated with the data record from the particular delta block that corresponds to the particular primary key to a location at an end of the data table on the magnetic hard disk storage device.

4. The method of claim 3, further comprising:
reconstructing, by the data processing system, a current version of the data record based on each of the delta changes flushed from the particular delta block that corresponds to the particular primary key.

5. The method of claim 1, further comprising:
storing, by the data processing system, within a particular delta block that corresponds to a particular primary key, pointers to delta changes associated with a data record that corresponds to the particular primary key; and
storing, by the data processing system, the delta changes associated with the data record in an append-only delta change area of the solid-state storage device.

6. The method of claim 5, further comprising:
responsive to the data processing system determining that the particular delta block that corresponds to the particular primary key contains a predetermined number of pointers to the delta changes associated with the data record, flushing, by the data processing system, the delta changes associated with the data record from the append-only delta change area to a location at an end of the data table on the magnetic hard disk storage device; and
reconstructing, by the data processing system, a current version of the data record based on each of the delta changes flushed from the append-only delta change area.

7. The method of claim 1, further comprising:
responsive to the data processing system determining that the append-only delta change area contains a predetermined number of delta changes, flushing, by the data processing system, the predetermined number of delta changes from the append-only delta change area to a location at an end of the data table on the magnetic hard disk storage device; and reconstructing, by the data processing system, a current version of the data record based on delta changes flushed from the append-only delta change area.

* * * * *